(12) United States Patent
Hiller et al.

(10) Patent No.: US 11,738,438 B2
(45) Date of Patent: Aug. 29, 2023

(54) POWER TOOL DEVICE

(71) Applicant: Robert Bosch GmbH, Stuttgart (DE)

(72) Inventors: Jan Hiller, Nuertingen (DE); Andras Vigh, Miskolc (HU); Janos Soltesz, Görbehaza (HU); Ulrich Bohne, Kohlberg (DE)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 17/052,096

(22) PCT Filed: Mar. 27, 2019

(86) PCT No.: PCT/EP2019/057691
§ 371 (c)(1),
(2) Date: Oct. 30, 2020

(87) PCT Pub. No.: WO2019/211046
PCT Pub. Date: Nov. 7, 2019

(65) Prior Publication Data
US 2021/0229257 A1   Jul. 29, 2021

(30) Foreign Application Priority Data
May 4, 2018   (DE) .................... 10 2018 206 866.6

(51) Int. Cl.
*B25F 5/00*     (2006.01)
*B23B 45/00*    (2006.01)
*B25B 21/00*    (2006.01)

(52) U.S. Cl.
CPC ............ *B25F 5/001* (2013.01); *B23B 45/008* (2013.01); *B25B 21/00* (2013.01)

(58) Field of Classification Search
CPC .... B25F 5/02; B25F 5/001; F16H 3/64; F16H 2200/2007; F16H 2200/2035
See application file for complete search history.

(56) References Cited

U.S. PATENT DOCUMENTS

| | | | |
|---|---|---|---|
| 2009/0160371 A1* | 6/2009 | Inagaki | B25F 5/001 318/12 |
| 2013/0206435 A1* | 8/2013 | Papp | B25F 5/001 173/20 |
| 2015/0122524 A1* | 5/2015 | Papp | B25B 21/00 173/20 |

FOREIGN PATENT DOCUMENTS

| | | |
|---|---|---|
| DE | 24 12 935 A1 | 10/1975 |
| EP | 1 787 765 A2 | 5/2007 |

(Continued)

OTHER PUBLICATIONS

International Search Report corresponding to PCT Application No. PCT/EP2019/057691, dated Aug. 5, 2019 (German and English language document) (6 pages).

*Primary Examiner* — Daniel Jeremy Leeds
(74) *Attorney, Agent, or Firm* — Maginot, Moore & Beck LLP

(57) ABSTRACT

A machine tool device includes at least one drive train unit including at least one gear shift element and which has at least two different rotational direction modes and at least two different speed modes, and with at least one switching unit arranged at least partially on the drive train unit. The switching unit comprises at least one actuating element, which is configured to select the rotational direction modes and the speed modes, and at least one switching element, which is configured to switch between the modes of rotation depending on a switching position of the actuating element.

15 Claims, 9 Drawing Sheets

(56) References Cited

FOREIGN PATENT DOCUMENTS

| EP | 2 762 278 A2 | 8/2014 |
|----|--------------|--------|
| GB | 2 058 253 A | 4/1981 |
| GB | 2 471 948 A | 1/2011 |

* cited by examiner

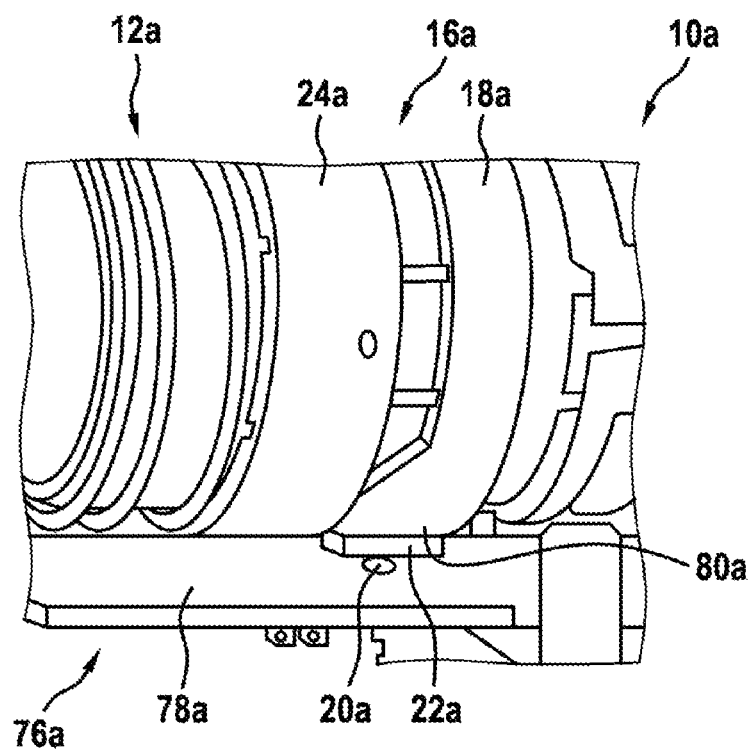
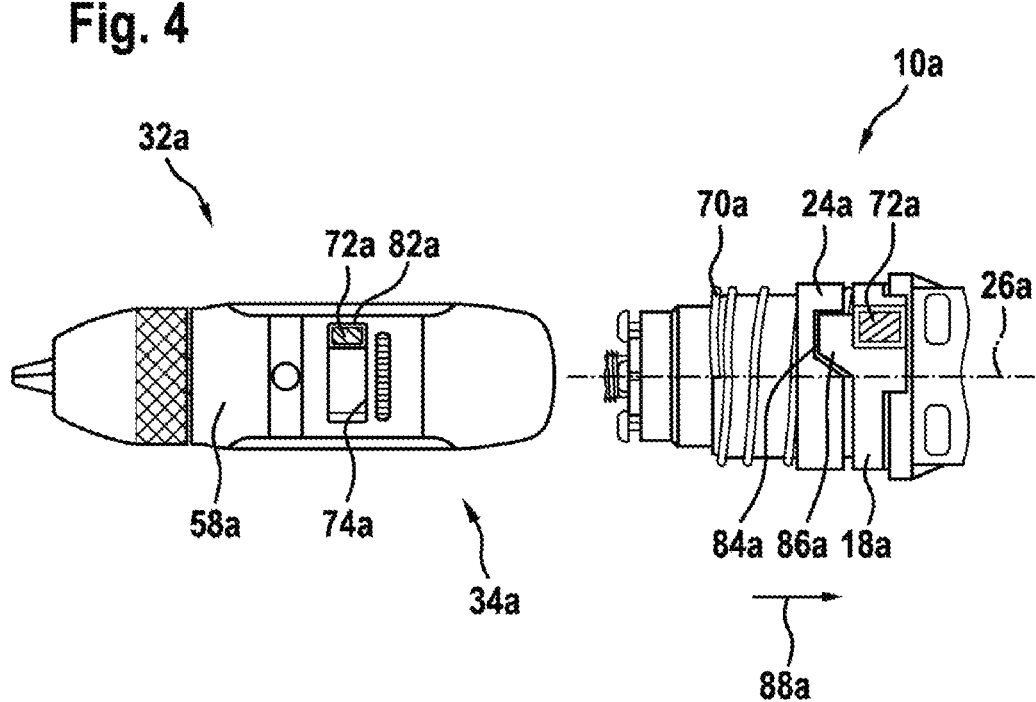

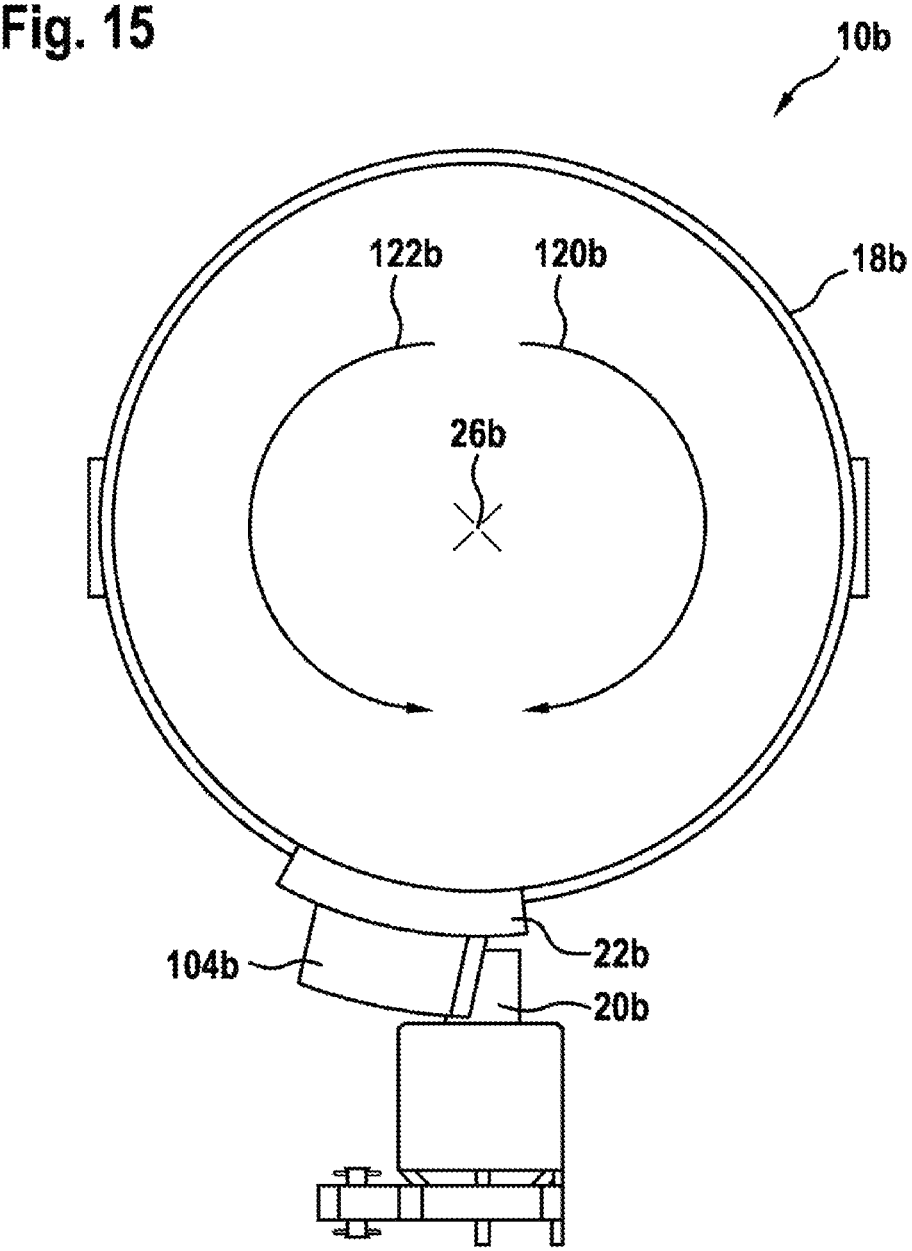

POWER TOOL DEVICE

This application is a 35 U.S.C. § 371 National Stage Application of PCT/EP2019/057691, filed on Mar. 27, 2019, which claims the benefit of priority to Serial No. DE 10 2018 206 866.6, filed on May 4, 2018 in Germany, the disclosures of which are incorporated herein by reference in their entirety.

BACKGROUND

There has already been proposed a power tool device, comprising at least one drive train unit, which comprises at least one gear shift element and which has at least two different direction-of-rotation modes and at least two different speed modes, and comprising at least one switching unit, which is arranged at least partially n the drive train unit.

SUMMARY

The disclosure is based on a power tool device, comprising at least one drive train unit, which comprises at least one gear shift element and which has at least two different direction-of-rotation modes and at least two different speed modes, and comprising at least one switching unit, which is arranged at least partially n the drive train unit.

It is proposed that the switching unit comprise at least one actuation element that is designed for selection of direction-of-rotation modes and the speed modes, and at least one switching element that is designed to switch between the direction-of-rotation modes in dependence on a switching position of the actuation element.

The power tool device is designed, in particular, for use in a power tool, in particular a hand-held power tool. The power tool is preferably realized as an electric screwdriver, in particular as a battery-powered electric screwdriver. The drive train unit preferably comprises at least one transmission. The transmission is preferably realized as a planetary transmission. The transmission is preferably arranged, at least partially, within at least one transmission housing of the drive train unit. The drive train unit preferably comprises at least one motor. The motor is preferably realized as an electric motor, in particular as a direct-current electric motor. The transmission is preferably designed to change at least one movement characteristic of the motor. The movement characteristic of the motor is preferably realized as a direction of rotation of the motor, a rotational speed of the motor, or another characteristic considered appropriate by persons skilled in the art. A direction of rotation of the motor is, in particular, a direction about which a drive shaft, in particular a rotor shaft, of the motor rotates about a drive axis of the motor. A rotational speed of the motor is, in particular, a speed at which the drive shaft, in particular the rotor shaft, of the motor rotates about the drive axis of the motor. Preferably, the transmission is coupled to the motor, in particular to the drive shaft of the motor. "Designed" is to be understood to mean, in particular, specially programmed, specially set-up, specially configured and/or specially equipped. That an object is designed for a particular function is to be understood to mean, in particular, that the object fulfils and/or performs this particular function in at least one application state and/or operating state.

The drive train unit, in particular the transmission, is preferably designed to transmit at least one movement characteristic of the motor, in particular following changing of the movement characteristic, to an output shaft of the power tool. The output shaft is preferably coupled to the drive train unit, in particular to the transmission. In particular, the output shaft projects, at least portionally, into the transmission housing. In particular, a tool receiver of the power tool, for receiving an insert tool, and/or an insert tool of the power tool are/is arranged on the output shaft. The tool receiver is preferably realized as a tool chuck, in particular as a clamping-jaw chuck. The insert tool is realized, in particular, as a screwdriver bit, as a drill bit, or the like. Preferably, the output shaft is designed to drive the tool receiver and/or the insert tool in rotation, in particular about an output axis of the power tool. Preferably, the output axis of the power tool is at least substantially parallel to, in particular coaxial with, the drive axis of the motor. Preferably, the output axis runs at least substantially along a longitudinal axis of the output shaft. A longitudinal axis of an object, in particular of an at least substantially cylindrical object, is in particular an axis that is aligned at least substantially perpendicularly in relation to a cross-sectional area of the object spanned by cylinder radii of the object. The expression "substantially perpendicularly" is intended to define, in particular, an alignment of a direction relative to a reference direction, the direction and the reference direction, in particular as viewed in one plane, enclosing an angle of 90°, and the angle having a maximum deviation of, in particular, less than 8°, advantageously less than 5°, and particularly advantageously less than 2°. "Substantially parallel" is to be understood here to mean, in particular, an alignment of a direction relative to a reference direction, in particular in one plane, the direction having a deviation from the reference direction of, in particular, less than 8°, advantageously less than 5°, and particularly advantageously less than 2°.

The drive train unit, in particular the motor and/or the transmission, preferably has at least one first direction-of-rotation mode and at least one second direction-of-rotation mode. In particular, the motor has at least one first direction-of-rotation mode which, in particular, corresponds to a first direction of rotation of the drive shaft of the motor about the drive axis. In particular, the motor has at least one second direction-of-rotation mode which, in particular, corresponds to a second direction of rotation of the drive shaft of the motor about the d rive axis that is opposite to the first direction of rotation. Preferably, the transmission is designed to drive the output shaft according to the direction of rotation of the motor. Preferably, the transmission is designed, in the first direction-of-rotation mode, to drive the output shaft in rotation in a first direction of rotation of the output shaft, about the output axis. Preferably, rotation of the output shaft in the first direction of rotation about the output axis may correspond to a clockwise rotation of the output shaft. Preferably, the transmission is designed, in the second direction-of-rotation mode, to drive the output shaft in rotation in a second direction of rotation of the output shaft, about the output axis, that in particular is opposite to the first direction of rotation. Preferably, a rotation of the output shaft in the second direction of rotation about the output axis may correspond to an anti-clockwise rotation of the output shaft. Preferably, the power tool is designed, in the first direction-of-rotation mode, for screwing a screw into a workpiece and/or for drilling into the workpiece. Preferably, the power tool is designed, in the second direction-of-rotation mode, for screwing a screw out of a workpiece.

The drive train unit, in particular the transmission and/or the motor, preferably has at least one first speed mode and one second speed mode. In particular, the transmission has at least one first speed mode and at least one second speed mode, the speed modes corresponding, in particular, to different switching positions of the transmission. Preferably, the transmission is designed, in the first speed mode, to drive the output shaft in rotation at a first rotational speed of the output shaft, about the output axis. Preferably, the transmission is designed, in the second speed mode, to drive the output shaft in rotation at a second rotational speed of the output shaft, about the output axis. Preferably, the second rotational speed of the output shaft is higher than the first rotational speed of the output shaft. It is conceivable for the drive train unit to have yet further speed modes that are other than the first speed mode and the second speed mode. The drive train unit, in particular the transmission, is designed in particular at least to combine the first direction-of-rotation mode, in particular of the motor, with the first speed mode and/or with the second speed mode. The drive train unit, in particular the transmission, is designed in particular at least to combine the second direction-of-rotation mode, in particular of the motor, with the first speed mode, preferably to combine the second direction-of-rotation mode, in particular of the motor, with the first speed mode and/or with the second speed mode.

The switching unit is designed, in particular, to switch between the direction-of-rotation modes and the speed modes. The actuation element of the switching unit is designed for selection of a direction-of-rotation mode and/or a speed mode by a user of the power tool, or of the power tool device. Preferably, the actuation element is designed for selection of a direction-of-rotation mode and a speed mode. Alternatively, it is conceivable for the actuation element to be designed only for section of a direction-of-rotation mode or a speed mode, and for the switching unit to have, in particular, at least one further actuation element, which is designed for selection of a direction-of-rotation mode or a speed mode, in particular of a mode that cannot be selected by the actuation element. The actuation element is preferably realized as a slide switch, in particular as a rotational slide switch, or as a rotary switch. Alternatively, it is conceivable for the actuation element to be realized as a linear slide switch, as a pushbutton switch, as a toggle switch, as a contact key, or as another actuation element considered appropriate by persons skilled in the art. Preferably, the actuation element has a plurality of switching positions. In particular, the actuation element has at least one switching position that corresponds to the first direction-of-rotation mode, at least one switching position that corresponds to the second direction-of-rotation mode, at least one switching position that corresponds to the first speed mode, and at least one switching position that corresponds to the second speed mode. The switching position that corresponds to the first direction-of-rotation mode and the switching position that corresponds to the first speed mode may be realized, in particular, by the same switching position.

The switching element is preferably designed to switch, in particular electronically, between the direction-of-rotation modes in dependence on a switching position of the actuation element. Alternatively or additionally, it is conceivable for the switching element to be designed to switch, in particular electronically, between the speed modes in dependence on a switching position of the actuation element. In particular, the switching element is designed, in the switching position of the actuation element corresponding to the first direction-of-rotation mode, to switch the transmission and/or the motor, in particular electronically, to the first direction-of-rotation mode. In particular, the switching element is designed, in the switching position of the actuation element corresponding to the second direction-of-rotation mode, to switch the transmission and/or the motor, in particular electronically, to the second direction-of-rotation mode. In particular, the switching element is connected, at least electronically, preferably electronically and mechanically, to an electronics unit of the power tool device. An "electronics unit" is to be understood to mean, in particular, a unit having at least one set of control electronics. A "set of control electronics" is to be understood to mean, in particular, a unit having a processor unit and having a memory unit, and having an operating program stored in the memory unit. Preferably, the electronics unit has at least one printed circuit board, on which there may be arranged, for example, a microprocessor, an integrated circuit, in particular an application-specific integrated circuit, an electronic logic circuit, or the like. Preferably, the switching element is electrically, or electronically, connected to the printed circuit board. In particular, the switching element may be arranged on, in particular fixed to, the printed circuit board.

Preferably, the switching element is designed to sense a switching position of the actuation element and, in particular in dependence on the sensed switching position of the actuation element, to provide the electronics unit with a signal, in particular an electronic signal, for switching the direction-of-rotation mode. Preferably, the electronics unit switches the transmission and/or the motor to the corresponding direction-of-rotation mode in dependence on the signal of the switching element. Preferably, the electronics unit switches the motor to the corresponding direction-of-rotation mode. In particular, the electronics unit matches an electrical polarity of the motor to a selected direction-of-rotation mode in dependence on the signal of the switching element. Alternatively, it is conceivable for the power tool device to have a mechanism, in particular a mechanical mechanism, that switches the transmission, in particular by means of the gear shift element, to the corresponding direction-of-rotation mode in dependence on a sensed switching position of the actuation element, in particular in dependence on a signal of the switching element. The switching element is preferably designed to mechanically and/or contactlessly sense a switching position of the switching element. The switching element may sense, in particular, a position of the actuation element and/or a position of an activation element of the switching unit that is coupled to the actuation element, in particular at least partially arranged on the actuation element, for the purpose of sensing the switching position of the actuation element. The switching element may be realized, in particular, as a switch, as a sensor, or as another switching element considered appropriate by persons skilled in the art.

Preferably, the switching unit is designed to switch mechanically between the speed modes, in particular in dependence on a switching position of the actuation element. In particular, the drive train unit has the gear shift element, which is designed to switch between the speed modes and which, in particular, is operatively connected to the switching unit. The gear shift element may preferably be realized as a stud, a pin, a spring clamp, or the like. Preferably, the gear shift element is coupled, in particular mechanically, to the transmission and to the switching unit. Preferably, the gear shift element is mechanically coupled to at least one switching gear wheel of the transmission. Preferably, the switching gear wheel is realized as an internal gear wheel. In particular, the gear shift element is designed to displace the switching gear wheel, in particular at least substantially parallel to the output axis, for the purpose of switching between the speed modes. In particular, the speed modes of the drive train unit are dependent on a position of the switching gear wheel. In particular, the switching gear wheel switches components, in particular toothed wheels, of the transmission, in particular in a manner known to persons skilled in the art, as a result of a displacement of the switching gear wheel. Preferably, for the purpose of displacing the switching gear wheel, the gear shift element is mounted in a movable manner, in particular movable at least substantially parallel to the output axis, on the transmission housing.

The design of the power tool device according to the disclosure can enable advantageously simple and convenient operation of a power tool, in particular in respect of setting of direction-of-rotation modes and speed modes. Advantageously, an at least substantially automatic, in particular electronic, switching between the direction-of-rotation modes, makes it possible to dispense with a plurality of, in particular complex, mechanical components for switching between the direction-of-rotation modes. It is possible to provide an advantageously compact, inexpensive and reliable power tool device, rendering possible an advantageously compact, low-cost and reliable power tool.

It is furthermore proposed that the switching unit comprise at least one activation element, which is assigned to the actuation element and which is designed to actuate the switching element, in particular to sense a switching position of the actuation element. In particular, the activation element is at least operatively connected to the actuation element. Preferably, the activation element is fixed, in particular at least non-positively and/or positively, to the actuation element. Alternatively, it is conceivable for the activation element to be connected to the actuation element in a materially bonded manner, in particular to be realized integrally with the actuation element. "Integrally" is to be understood to mean, in particular, formed as one piece. Preferably, this one piece is produced from a single blank, a body and/or a casting, particularly preferably in an injection molding process, in particular a single-component and/or multi-component injection molding process. The activation element may preferably be at least partially integrated into the actuation element. In particular, the actuation element may be realized, at least partially, as an activation element, or perform a function of an activation element. The activation element may also be realized separately from the actuation element. In particular, the switching unit may have a plurality of activation elements, of which, in particular, at least one activation element is realized separately from the actuation element. In particular, the activation element may be realized as a plurality of parts, in which case, in particular, at least a part of the activation element is fixed to the actuation element and at least a further part of the activation element is realized separately from the actuation element. The activation element is designed, in particular, for contactless actuation of the switching element, in particular realized as a sensor, and/or for mechanical actuation of the switching element, in particular realized as a mechanical switch or signal switch. Preferably, the activation element switches the switching element differently in different positions of the activation element. A position of the activation element is preferably dependent on, in particular is proportional to, a switching position of the actuation element. Preferably, different positions of the activation element correspond to different direction-of-rotation modes. The activation element may be realized, in particular, as a switching rod, as a magnet, as a temperature source, as a light source, or as another activation element considered appropriate by persons skilled in the art. Advantageously, automatic actuation of the switching element in dependence on a switching position of the actuation element can be made possible.

It is furthermore proposed that the activation element be designed for mechanical actuation of the switching element. Preferably, the activation element is designed for mechanical actuation of the switching element, which is realized as a mechanical switch or a signal switch. For the purpose of mechanical actuation of the switching element, the activation element may be realized, in particular, as a switching rod, as a switching button, as an activation extension, in particular of the actuation element, or as another activation element considered appropriate by persons skilled in the art. Preferably, the activation element is designed to press, displace, rotate, etc. the switching element, for the purpose of actuating it mechanically. Preferably, the activation element is arranged on a side of the actuation element, or at least partially realizes the side that faces toward the switching element in at least one switching position of the actuation element. Preferably, a position of the activation element facing toward the switching element and a position of the activation element facing away from the switching element correspond to two different switching positions of the actuation element and to two different direction-of-rotation modes, in particular to the first direction-of-rotation mode and the second direction-of-rotation mode, respectively. The possibility to actuate the switching element in an advantageously energy-efficient manner can be provided.

It is additionally proposed that the activation element be designed for contactless, in particular magnetic, actuation of the switching element. Preferably, the activation element is designed for contactless, in particular magnetic, actuation of the switching element, which is realized as a sensor, in particular as a Hall sensor. Preferably, for the purpose of magnetic actuation of the switching element, the activation element is at least partially magnetic, in particular is realized as a magnet. Preferably, the activation element is realized as a permanent magnet, for example of iron, cobalt, nickel, or the like, or as an electromagnet, for example in the form of a coil. In particular, it is conceivable for the actuation element, for the purpose of realizing the activation element, to be at least partially magnetic. Alternatively, it is conceivable for the activation element to be designed for contactless actuation of the switching element other than by magnetic actuation of the switching element, for example for optical, thermal, capacitive or other actuation of the switching element considered appropriate by persons skilled in the art. For the purpose of optically actuating the switching element, the activation element may be realized, in particular, as a light source, as a light absorber, or the like. For the purpose of thermally actuating the switching element, the activation element may be realized, in particular, as a heat source, as a low-temperature source, or the like. For the purpose of capacitively actuating the switching element, the activation element may be realized, in particular, as an electrode, as a dielectric, or the like. Preferably, the activation element is arranged on a side of the actuation element, or at least partially realizes the side that faces toward the switching element in at least one switching position of the actuation element. Preferably, a position of the activation element facing toward the switching element and a position of the activation element facing away from the switching element correspond to two different switching positions of the actuation element and to two different direction-of-rotation modes, in particular to the first direction-of-rotation mode and the second direction-of-rotation mode, respectively. An advantageously reliable actuation of the switching element can be made possible.

It is furthermore proposed that the switching element be realized as a sensor, in particular as a Hall sensor. The switching element is realized, in particular, as a magnet sensor, preferably as a Hall sensor. Alternatively, it is conceivable for the switching element to be realized as an optical sensor, for example as a light barrier, as a brightness sensor, as a laser scanner, or the like, as a thermal sensor, in particular as a temperature sensor, as a capacitive sensor, or as another sensor considered appropriate by persons skilled in the art. In particular, the switching element is realized as a contactless sensor. Preferably, the switching element can be supplied with electrical energy and/or operated by a battery unit of the power tool, in particular via the electronics unit. Preferably, the switching element senses a magnetic field strength, the magnitude of which, in particular, is dependent on a switching position of the actuation element. Preferably, different sensed magnetic field strengths correspond to different switching positions of the actuation element. The magnetic field strength may originate, in particular, from an at least partially magnetically realized actuation element and/or a magnetic activation element of the switching unit. Preferably, the switching element, in dependence on the sensed magnetic field strength, provides the electronics unit with an electrical, or electronic signal, in dependence on which the electronics unit switches the transmission and/or the motor to a corresponding direction-of-rotation mode. Advantageously, contactless, in particular at least substantially wear-free, switching between the direction-of-rotation modes can be made possible.

It is also proposed that the switching element be realized as a mechanical switch or a signal switch. In particular, the switching element, as an alternative or in addition to being realized as a sensor, in particular as a Hall sensor, is realized as a mechanical switch or signal switch. In particular, it is conceivable for the switching unit to have at least one switching element realized as a sensor, in particular as a Hall sensor, and a switching element realized as a mechanical switch or a signal switch, in particular for redundant switching between the direction-of-rotation modes. The switching element may be realized, in particular, as a pushbutton switch, as a side switch, as a rocker switch, as a rotary switch, as a toggle switch, or as another mechanical switch or signal switch considered appropriate by persons skilled in the art. Preferably, the switching element can be actuated mechanically by the actuation element and/or an activation element for the purpose of switching between the direction-of-rotation modes. In particular, the switching element may have a plurality of switching levels, in particular corresponding to the switching positions of the actuation element. Preferably, the switching element can be actuated differently in different switching positions of the actuation element, in particular can be switched to different switching levels. In particular, the activation element may actuate the switching element differently according to different switching positions of the actuation element, in particular switch it to different switching levels. Preferably, the switching element, in dependence on the switching level, provides the electronics unit with an electrical, or electronic signal, in dependence on which the electronics unit switches the transmission and/or the motor to a corresponding direction-of-rotation mode. Advantageously, electronic switching of the direction-of-rotation modes via a mechanical coupling can be achieved.

It is furthermore proposed that the switching unit have at least one displacement element, which is operatively connected to the actuation element and which is designed to switch the speed modes in dependence on a switching position of the actuation element. Preferably, the displacement element is mechanically coupled, in particular directly or indirectly, to the drive train unit, in particular to the gear shift element. In particular, the displacement element is mounted in a movable manner, in particular movable at least substantially parallel to the output axis, on the drive train unit, in particular on the transmission housing. Preferably, the displacement element may be arranged at least substantially in the form of a ring around the transmission housing, in particular realized as a displacement ring. Preferably, the displacement element is mounted on, or at, a spring. Preferably, the spring exerts a force, directed at least substantially parallel to the output axis, upon the switching element. Preferably, the displacement element is mechanically coupled to the actuation element and is displaceable, contrary to the force, by the actuation element. Preferably, the activation element may be arranged at least partially on the displacement element and, in particular, be designed to effect mechanical connection between the actuation element and the displacement element. Advantageously, setting of the speed modes can be achieved.

It is additionally proposed that the displacement element be designed to actuate the gear shift element that is operatively connected to the displacement element, in particular along an output axis of the drive train unit, for the purpose of switching between the speed modes. Preferably, the gear shift element is non-positively and/or positively connected to the displacement element, in particular fixed to the displacement element. Alternatively or additionally, it is conceivable for the gear shift element to be materially bonded to the displacement element, in particular to be realized integrally with the displacement element. In particular, the gear shift element establishes an operative connection, in particular a mechanical operative connection, between the displacement element and the transmission, in particular the switching gear wheel of the transmission. In particular, the displacement element actuates, in particular displaces, the gear shift element as a result of an actuation of the displacement element. In particular, the gear shift element actuates, in particular displaces, the switching gear wheel as a result of an actuation of the gear shift element by the displacement element. Preferably, the actuation element is operatively connected, in particular mechanically, via the displacement element and the gear shift element, to the transmission, in particular to the switching gear wheel. In particular, an actuation of the actuation element for selection of a speed mode is transmitted to the transmission, in particular the switching gear wheel, via the displacement element and the gear shift element. Preferably, the displacement element displaces the gear shift element at least substantially parallel to the output axis, and the gear shift element displaces, in particular, the switching gear wheel at least substantially parallel to the output axis. Advantageously, an operative connection between the actuation element and the transmission can be realized via an operative connection of the displacement element to the gear shift element.

It is furthermore proposed that, for the purpose of actuating the displacement element, the actuation element and/or the displacement element be realized at least portionally in the manner of a ramp. Preferably, the at least partially ramp-type realization of the actuation element and/or of the displacement element is designed to convert a rotational movement of the actuation element into a translational movement of the displacement element, in particular at least substantially parallel to the output axis. In particular, the displacement element may slide along at least one ramp-type portion of the displacement element and/or of the actuation element, at least substantially perpendicularly in relation to a direction of rotation of the actuation element. In particular, the displacement element is pushed by the ramp-type portion contrary to a force exerted upon the displacement element by the spring, on which, or at which, the displacement element is mounted. In particular, the actuation element and/or the displacement element may have at least one ramp-type extension and/or at least one ramp-type opening. Preferably, it is conceivable for the displacement element to have at least one ramp-type opening, in particular on a side of the displacement element that faces toward the actuation element, and for the actuation element to have at least one ramp-type extension, in particular on a side of the actuation element that faces toward the displacement element. Preferably, the ramp-type extension, in at least one switching position of the actuation element, engages, at least substantially in a form-precise manner, in the ramp-type opening. In particular, the ramp-type extension, in at least one further switching position of the actuation element, is pushed at least partially, preferably completely, out of the ramp-type opening. Advantageously, an efficient transmission of force can be achieved between the actuation element and the displacement element, in particular for the purpose of displacing the displacement element.

It is also proposed that the displacement element be mounted, in particular spring-mounted, on the drive train unit so as to be movable along an output axis of the drive train unit. Preferably, the displacement element is arranged at least substantially in the form of a ring around the drive train unit, in particular around the transmission housing. Preferably, the displacement element is mounted on, or at, the spring, in particular a compression spring, of the drive train unit. In particular, the spring may be arranged in the manner of a helical spring around the transmission housing. Preferably, the spring is arranged on the transmission housing, between the transmission housing and the displacement element. In particular, the displacement element is mounted on the transmission housing so as to be movable by the spring along the output axis. Preferably, the spring exerts upon the displacement element a force that is at least substantially parallel to the output axis and by which the displacement element can be displaced along the output axis. Preferably, the actuation element, in particular by means of the at least portionally ramp-type realization of the actuation element and/or of the displacement element, exerts upon the displacement element, at least substantially parallel to the output axis, a force that acts contrary to the force exerted by the spring and by which the displacement element can be displaced along the output axis. Preferably, the displacement element displaces the switching gear wheel as a result of a movement along the output axis, via the gear shift element, and in particular switches it between the speed modes. Advantageously, a functional and compactly realized switching unit can be provided.

It is furthermore proposed that the displacement element have at least one shift gate for actuating the gear shift element, in particular along an output axis of the drive train unit. Preferably, the shift gate is realized as a, in particular at least substantially slot-type, recess, in the displacement element. The shift gate extends at least along a partial circumference of the displacement element realized, in particular, as a displacement ring. Preferably, the shift gate comprises at least one first portion that extends at least substantially perpendicularly in relation to the output axis. Preferably, the shift gate comprises at least one second portion that is arranged, offset from the first portion, along the output axis. In particular, the displacement element comprising the shift gate is mounted on the drive train unit, in particular on the transmission housing, so as to be at least substantially immovable along the output axis. In particular, the displacement element comprising the shift gate is mounted on the drive train unit, in particular on the transmission housing, so as to be rotatable about the output axis. Preferably, the gear shift element is arranged at least partially in the shift gate. In particular, the gear shift element extends, at least portionally, at least substantially perpendicularly in relation to the output axis, in the shift gate. In particular, the shift gate realized as a recess in the displacement element has a width that corresponds at least substantially to a diameter of the gear shift element. The shift gate is designed to displace the gear shift element, in particular along the output axis, in particular as a result of a rotational movement of the displacement element about the output axis. In particular, as a result of a rotational movement of the displacement element, the gear shift element slides within and along the shift gate, in particular following a shaping of the shift gate. Preferably, the gear shift element is displaced at least between the first portion of the shift gate and the second portion of the shift gate as a result of a rotation of the displacement element. In particular, a displacement of the gear shift element between the first portion of the shift gate and the second portion of the shift gate corresponds to a displacement of the gear shift element along the output axis. Preferably, the displacement element the displacement element rotates about the output axis as a result of a rotation of the actuation element about the output axis. In particular, the displacement element is mechanically connected to the actuation element, in particular via the activation element. Advantageously, an actuation, in particular a displacement, of the gear shift element along the output axis can be achieved as a result of a rotational movement of the displacement element.

It is also proposed that the actuation element be arranged at least substantially in the form of a ring around the drive train unit. Preferably, the actuation element is arranged at least substantially in the form of a ring around the transmission housing. In particular, the actuation element is realized as an actuation ring, in particular as a rotary ring. Preferably, the actuation element is mounted on, in particular around, the transmission housing so as to be rotatable about the output axis. Preferably, the displacement element is realized as a displacement ring. Preferably, the displacement element is arranged at least substantially in the form of a ring around the drive train unit, in particular the transmission housing. Preferably, the displacement element is mounted on, in particular around, the transmission housing, in particular at the spring of the drive train unit, so as to be displaceable at least substantially parallel to the output axis. Preferably, the actuation element and the displacement element, in at least one switching position of the actuation element, bear against each other, as viewed along the output axis, in particular at least substantially in a form-precise manner. Preferably, the actuation element and the switching element, in at least one switching position of the actuation element, are arranged at least portionally spaced apart from each other on the transmission housing, as viewed along the output axis. Alternatively, it is conceivable for the actuation element and the displacement element, irrespective of a switching position of the actuation element, to be arranged in fixed positions relative to each other, in particular connected to each other by the activation element, on the transmission housing. Preferably, the actuation element, when the switching unit has been mounted in a power tool, is arranged at least substantially completely within a housing unit of the power tool. Preferably, the actuation element comprises at least one actuation extension for actuating the actuation element. In particular, the actuation extension, when the switching unit is in a mounted state, projects at least portionally out of the housing unit of the power tool, in particular through an actuation recess of the housing unit. An actuation element can be provided that enables the power tool device, or a power tool, to be realized in an advantageously compact manner.

It is furthermore proposed that the switching unit has at least one output unit for optical, acoustic and/or haptic output in dependence on an actuation and/or switching position of the actuation element. Preferably, the output unit is arranged at least partially on the actuation element. The output unit may have at least one display element for optical output. The display element may be realized as a static display element or as a dynamic display element. A static display element may represent, in particular, at least one direction-of-rotation mode and/or speed mode. The static display element may be realized, in particular, as a symbol, for example as an arrow, a dot, a schematic screwdriver, a schematic power drill, or the like. For example, an arrow pointing in the direction of the insert tool may represent the first direction-of-rotation mode and/or the first speed mode. For example, an arrow pointing away from the insert tool may represent the second direction-of-rotation mode and/or the first speed mode. For example, a double arrow may represent the second speed mode. For example, a schematic screwdriver may represent the first speed mode. For example, a schematic power drill may represent the second speed mode. Preferably, the output unit has a plurality of static display elements, which represent different direction-of-rotation modes and/or speed modes and which, in particular, are arranged on the actuation element, in particular are imprinted on the actuation element, according to different switching positions of the actuation element. The dynamic display element may be realized, in particular, as an LED, as a display screen, or the like. Preferably, the dynamic display element is designed to represent different symbols, colors, flashing speeds, or the like, in dependence on different switching positions of the actuation element.

For the purpose of acoustic output, the output unit may preferably have at least one loudspeaker. Preferably, the loudspeaker is designed to output different tones, tone sequences, tone numbers, announcements, or the like, in dependence on different switching positions of the actuation element. For the purpose of haptic output, the output unit may have at least one vibration motor, a latching spring element, or the like. The vibration motor is preferably designed to output different vibrations, vibration sequences, vibration durations, or the like, in dependence on different switching positions of the actuation element. The latching spring element may be arranged, in particular, at least substantially radially in relation to the output axis. Preferably, the latching spring element is designed to exert a force, in particular directed at least substantially radially away from the output axis, upon the actuation element. Preferably, the actuation element has at least one latching recess which, in at least one switching position of the switching element, can be latched, in particular separably, with the latching spring element. In particular, the actuation element may have a plurality of latching recesses, one latching recess in each case representing respectively one switching position of the actuation element. Preferably, a latching of the latching spring element with a latching recess, in particular upon an actuation of the actuation element, can be perceived haptically. Advantageously, a switching position and/or an actuation of the actuation element can be communicated to a user.

It is additionally proposed that the switching unit have a single actuation element for selection of the direction-of-rotation modes and the speed modes. Preferably, the single actuation element is realized so as to be at least substantially similar to the actuation element described above. In particular, different switching positions of the single actuation element correspond to different direction-of-rotation modes and, simultaneously, to different speed modes of the drive train unit. In particular, a first switching position of the single actuation element may correspond to the first direction-of-rotation mode, in particular of the motor, and to the first speed mode, in particular of the transmission. In particular, a second switching position of the single actuation element may correspond to the first direction-of-rotation mode, in particular of the motor, and to the second speed mode, in particular of the transmission. In particular, a third switching position of the single actuation element may correspond to the second direction-of-rotation mode, in particular of the motor, and to the first speed mode, in particular of the transmission. Preferably, the switching element is designed to switch, at least substantially automatically, in particular electronically, between the direction-of-rotation modes, in dependence on a switching position of the single actuation element. Preferably, the displacement element is designed to switch mechanically between the speed modes in dependence on a switching position of the single actuation element. Alternatively, it is conceivable for the switching element to be designed to switch, at least substantially automatically, in particular electronically, between the direction-of-rotation modes and the speed modes in dependence on a switching position of the single actuation element. It is advantageously possible to dispense with an additional actuation element for selection of the speed modes and the direction-of-rotation modes. It is possible to provide an advantageously inexpensive and compact power tool device, rendering possible a power tool that is advantageously inexpensive, compact and convenient to operate.

The disclosure is furthermore based on a power tool, in particular a hand-held power tool, comprising at least one power tool device according to the disclosure. The power tool is preferably realized as an electric hand-held power tool, in particular as a cordless electric hand-held power tool. Preferably, the power tool is realized as an electric screwdriver, in particular as a battery-operated electric screwdriver. Alternatively, it is conceivable for the power tool to be realized as a power drill, as a hammer drill, or as another power tool considered appropriate by persons skilled in the art. Preferably, the power tool comprises at least one housing unit, in which the power tool device is arranged, at least partially. In particular, the housing unit has at least one first housing shell element and at least one second housing shell element, which are preferably connected to each other, in particular fixed to each other, via the drive train unit. The power tool may preferably comprise further components necessary for operation of the power tool such as, for example, a battery unit, a tool receiver, an insert tool, or the like. In particular, the power tool has at least one switch unit, which is designed for activating and/or deactivating the motor of the power tool. Alternatively or additionally, it is conceivable for the switching element of the switching unit to be designed to activate and/or deactivate the motor automatically, in particular electronically, in dependence on a switching position of the actuation element. In particular, the switching element may have a neutral switching position, in which the switching element deactivates the motor. In particular, the switching element may activate the motor in a switching position of the actuation element that corresponds to the first speed mode, the second speed mode or at least one further speed mode. An advantageously compact, inexpensive and reliable power tool can be provided.

The power tool device according to the disclosure and/or the power tool according to the disclosure are/is not intended in this case to be limited to the application and embodiment described above. In particular, the power tool device according to the disclosure and/or the power tool according to the disclosure may have individual elements, component parts and units that differ in number from a number stated herein, in order to fulfill an operating principle described herein. Moreover, in the case of the value ranges specified in this disclosure, values lying within the stated limits are also to be deemed as disclosed and applicable in any manner.

BRIEF DESCRIPTION OF THE DRAWINGS

Further advantages are given by the following description of the drawings. The drawings show two exemplary embodiments of the disclosure. The drawings, the description and the claims contain numerous features in combination. Persons skilled in the art will expediently also consider them individually and combine them to form appropriate further combinations.

There are shown.

DETAILED DESCRIPTION

Figure 1:
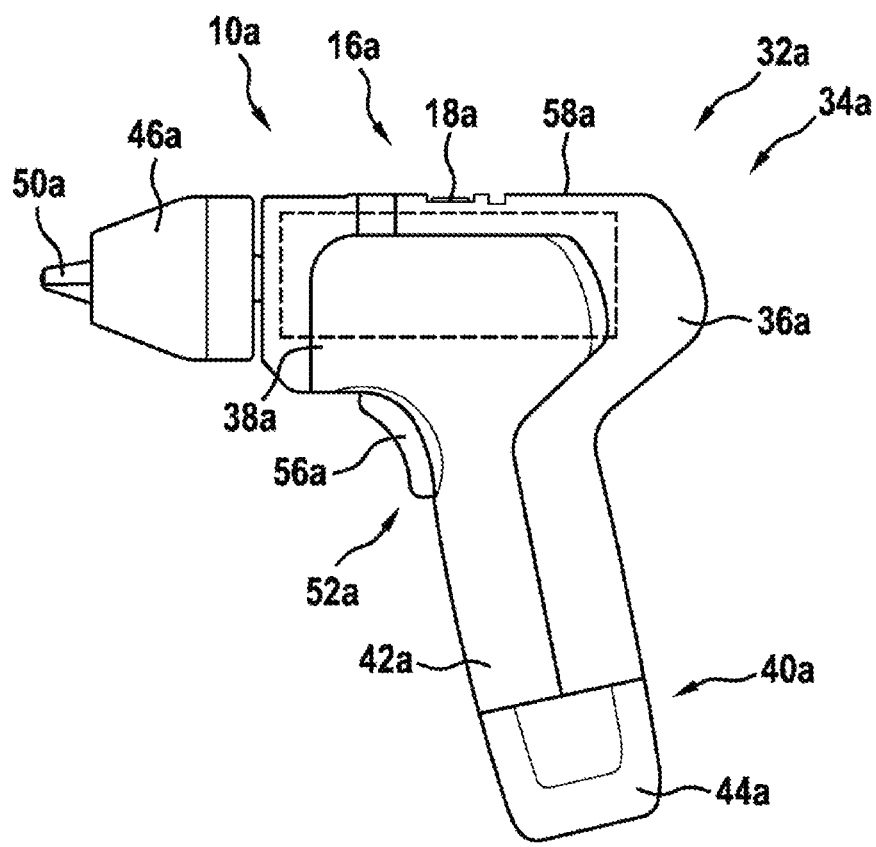
FIG. 1 a side view of a power tool according to the disclosure, in a schematic representation, FIG. 2 a part of a power tool device according to the disclosure, in a schematic sectional representation, FIG. 3 a part of the power tool device according to the disclosure, in a perspective representation, FIG. 4 a first switching position of an actuation element of a switching unit of the power tool device according to the disclosure, in a schematic top view, FIG. 5 a second switching position of the actuation element of a switching unit of the power tool device according to the disclosure, in a schematic top view, FIG. 6 a third switching position of the actuation element of a switching unit of the power tool device according to the disclosure, in a schematic top view, FIG. 7 a part of the power tool device according to the disclosure, in a schematic sectional representation, FIG. 8 an alternative power tool, in a perspective representation, FIG. 9 a first alternative of an output unit of a switching unit of an alternative power tool device according to the disclosure, in a perspective representation, FIG. 10 a second alternative of an output unit of a switching unit of the alternative power tool device according to the disclosure, in a schematic representation, FIG. 11 a third alternative of an output unit of a switching unit of the alternative power tool device according to the disclosure, in a perspective representation, FIG. 12 the alternative power tool device according to the disclosure, in a schematic representation, FIG. 13 the alternative power tool device according to the disclosure from FIG. 12, in a perspective representation, FIG. 14 a part of the alternative power tool device according to the disclosure from FIG. 12, in a perspective representation, and FIG. 15 a front view of the alternative power tool device according to the disclosure from FIG. 12, in a schematic representation.

FIG. 1 shows a side view of a power tool 32a according to the disclosure, in a schematic representation. The power tool 32a is realized as an electric hand-held power tool. The power tool 32a is realized as a cordless electric hand-held power tool. The power tool 32a is realized as a battery-operated electric screwdriver. Alternatively, it is conceivable for the power tool 32a to be realized as a power drill, as a hammer drill, or the like. The power tool 32a comprises a power tool device 10a. The power tool 32a comprises a housing unit 34a. The power tool device 10a is arranged, at least partially, within the housing unit 34a. The power tool device 10a is indicated by a broken line. The housing unit 34a has a first housing shell element 36a and a second housing shell element 38a. The first housing shell element 36a and the second housing shell element 38a are connected to each other, in particular fixed to each other, via a drive train unit 12a of the power tool device 10a. The drive train unit 12a is not represented further in FIG. 1. The power tool 32a comprises further components necessary for operation of the power tool 32a. The power tool 32a comprises a battery unit 40a. The battery unit 40a is designed for supplying energy at least to the power tool device 10a. The battery u nit 40a is realized as an accumulator. Alternatively, it is conceivable for the battery unit 40a to be realized as a battery, as a capacitor, or the like. The battery unit 40a is accommodated, at least partially, in a handle 42a of the housing unit 34a. The handle 42a is realized by the first housing shell element 36a and by the second housing shell element 38a. A cover cap 44 of the battery unit 40a projects out of the handle 42a and elongates the handle 42a.

The power tool 32a has a tool receiver 46a. The tool receiver 46a is arranged, in particular fixed (see FIG. 2), on an output shaft 48a of the power tool 32a. The tool receiver 46a is designed to receive an insert tool 50a of the power tool 32a. The insert tool 50a can be driven in rotation by the output shaft 48a, via the tool receiver 46a, about an output axis 26a of the drive train unit 12a. The tool receiver 46a is realized as a tool chuck, in particular as a clamping-jaw chuck. In FIG. 1 the insert tool is realized, exemplarily, as a screwdriver bit. Alternatively, it is conceivable for the insert tool 50a to be realized as a drill bit, or the like. The power tool 32a has a switch unit 52a. The switch unit 52a is designed for activating and/or deactivating a motor 54a of the drive train unit 12a. The switch unit 52a comprises an actuation switch 56a, which can be activated for the purpose of activating and/or deactivating the motor 54a. The activation switch 56a is arranged on the handle 42a. The power tool device 10a comprises a switching unit 16a. The switching unit 16a has an actuation element 18a. The actuation element 18a is arranged on a top side 58a of the power tool 32a. The top side 58a faces away from the handle 42a.

Figure 2:
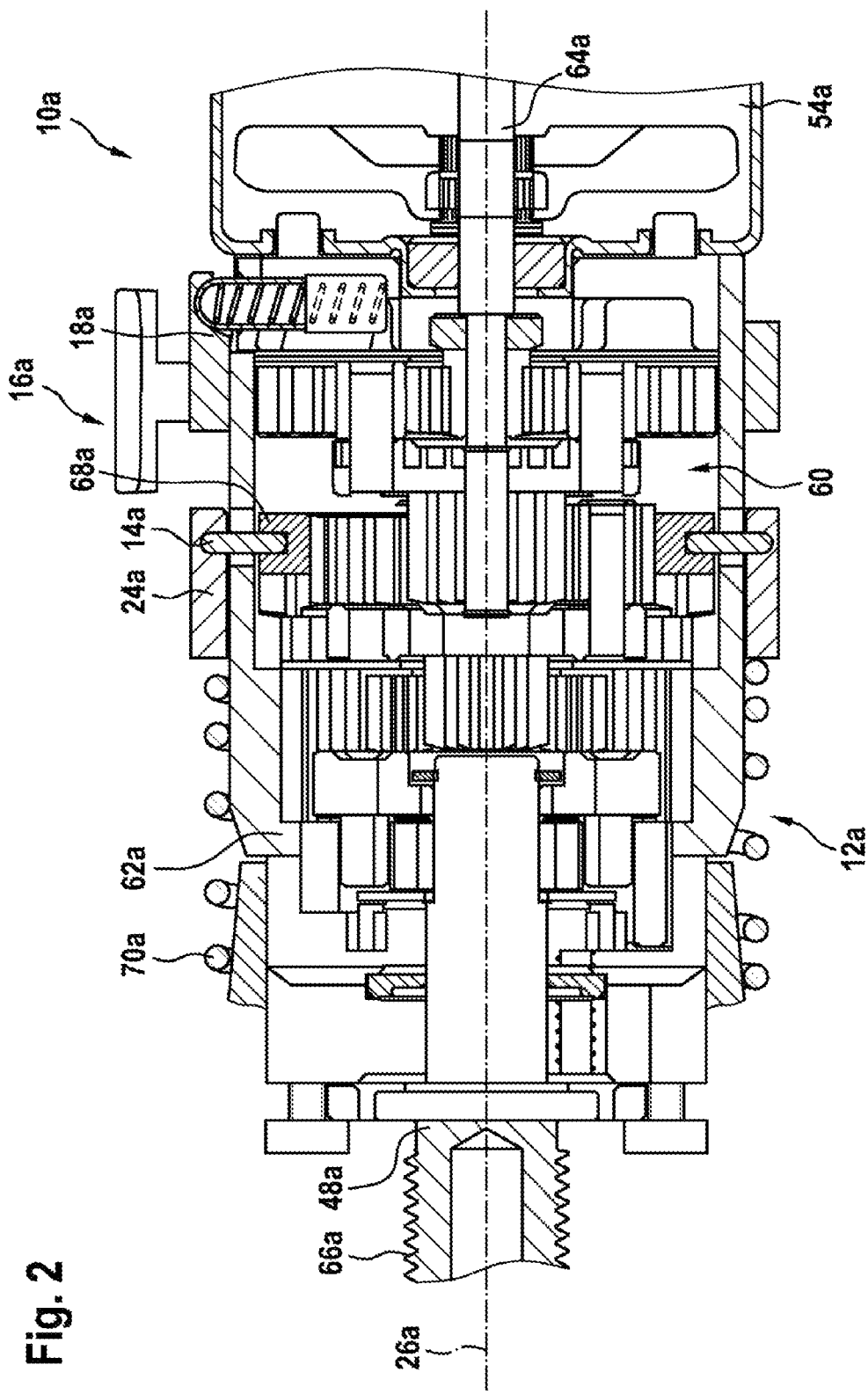

FIG. 2 shows a part of the power tool device 10a, in a schematic sectional representation. The power tool device 10a comprises the drive train unit 12a. The drive train unit 12a comprises a gear shift element 14a. The drive train unit 12a has at least two different direction-of-rotation modes and at least two different speed modes. The power tool device 10a comprises the switching unit 16a. The switching unit 16a is arranged, at least partially, on the drive train unit 12a. The switching unit 16a comprises the actuation element 18a. The actuation element 18a is designed for selection of the direction-of-rotation modes and speed modes. The switching unit 16a comprises a switching element 20a (see FIG. 3). The switching element 20a is designed to switch between the direction-of-rotation modes in dependence on a switching position of the actuation element 18a. The drive train unit 12a comprises a transmission 60a. The transmission 60a is realized as a planetary transmission. The drive train unit 12a comprises a transmission housing 62a. The transmission housing 62 is at least substantially cylindrical. The transmission 60a is arranged, at least partially, within the transmission housing 62a. The drive train unit 12a, in particular the transmission 60a, is designed to change at least one movement characteristic of the motor 54a. The motor 54a is realized as an electric motor, in particular as a direct-current electric motor. The movement characteristic of the motor 54a is realized as direction of rotation of the motor 54a, as a rotational speed of the motor 54a, or as another movement characteristic considered appropriate by persons skilled in the art. A rotational direction of the motor 54a is a direction about which a drive shaft 64a of the motor 54a rotates about a drive axis of the motor 54a. The drive shaft 64a is realized as a rotor shaft of the motor 54a. A rotational speed of the motor 54a is a speed at which the drive shaft 64a of the motor 54a rotates about the drive axis of the motor 54a. The drive axis of the motor is at least substantially parallel to, in particular coaxial with, the output axis 26a of the drive train unit 12a. The transmission 60a is coupled to the drive shaft 64a of the motor 54a.

The drive train unit 12a, in particular the transmission 60a, is designed to transmit at least one movement characteristic of the motor 54a, in particular following changing of the movement characteristic, to the output shaft 48a of the power tool 32a. The output shaft 48a is coupled to the drive train unit 12a, in particular to the transmission 60a. The output shaft 48a projects, at least portionally, into the transmission housing 62a. The tool receiver 46a of the power tool 32a is arranged on the output shaft 48a (see FIG. 1). The tool receiver 46a is screwed onto the output shaft 48a by means of a thread 66a of the output shaft 48a. For reasons of clarity, the tool receiver 46a is not represented in FIG. 2. The output shaft 48a is designed to drive the toll receiver 46a and the insert tool 50a in rotation, in particular about the output axis 26a. The output axis 26a runs at least substantially along a longitudinal axis of the output shaft 48a. The drive train unit 12a, in particular the motor 54a and/or the transmission 60a, has at least one first direction-of-rotation mode and one second direction-of-rotation mode. The motor 54a has at least one first direction-of-rotation mode, which corresponds to a first direction of rotation of the drive shaft 64a of the motor 54a about the drive axis. The motor 54a has at least one second direction-of-rotation mode, which corresponds to a second direction of rotation of the drive shaft 64a of the motor 54a, about the drive axis, that is opposite to the first direction of rotation. The transmission 60a is designed to drive the output shaft 48a according to the direction of rotation of the motor 54a. The transmission 60a is designed, in the first direction-of-rotation mode, to drive the output shaft 48a in rotation, in a first direction of rotation of the output shaft 48a, about the output axis 26a. A rotation of the output shaft 48a in the first direction of rotation about the output axis 26a corresponds to a clockwise rotation of the output shaft 48a. The transmission 60a is designed, in the second direction-of-rotation mode, to drive the output shaft 48a in rotation, in a second direction of rotation of the output shaft 48a, about the output axis 26a, that is opposite to the first direction of rotation. A rotation of the output shaft 48a in the second direction of rotation about the output axis 26a corresponds to an anti-clockwise of the output shaft 48a. The power tool 32a is designed, in the first direction-of-rotation mode, for screwing a screw into a workpiece and/or drilling into the workpiece. The power tool 32a is designed, in the second direction-of-rotation mode, for screwing a screw out of a workpiece. The drive train unit 12a, in particular the transmission 60a and/or the motor 54a, has at least one first speed mode and one second speed mode. The transmission 60a has at least one first speed mode and at least one second speed mode, the speed modes corresponding to different switching positions of the transmission 60a. The transmission 60a is designed, in the first speed mode, to drive the output shaft 48a in rotation, at a first rotational speed of the output shaft 48a, about the output axis 26a. The transmission 60a is designed, in the second speed mode, to drive the output shaft 48a in rotation, at a second rotational speed of the output shaft 48a, about the output axis 26a. The second rotational speed of the output shaft 48a is higher than the first rotational speed of the output shaft 48a. It is conceivable for the drive train unit 12a to have yet further speed modes that are other than the first speed mode and the second speed mode. The drive train unit 12a, in particular the transmission 60a, is designed at least to combine the first direction-of-rotation mode, in particular of the motor 54a, with the first speed mode and/or with the second speed mode. The drive train unit 12a, in particular the transmission 60a, is designed at least to combine the second direction-of-rotation mode, in particular of the motor 54a, with the first speed mode and/or with the second speed mode.

The switching unit 16a is designed to switch between the direction-of-rotation modes and the speed modes. The actuation element 18a of the switching unit 16a is designed for selection of a direction-of-rotation mode and/or a speed mode by a user of the power tool 32a, or of the power tool device 10a. The actuation element 18a is designed for selection of a direction-of-rotation mode and a speed mode. The switching unit 16a has a single actuation element 18a for selection of the direction-of-rotation modes and the speed modes. Different switching positions of the single actuation element 18a correspond to different direction-of-rotation modes and, simultaneously, to different speed modes of the drive train unit 12a. A first switching position of the single actuation element 18a corresponds to the first direction-of-rotation mode, in particular of the motor 54a, and to the first speed mode, in particular of the transmission 60a. A second switching position of the single actuation element 18a corresponds to the first direction-of-rotation mode, in particular of the motor 54a, and to the second speed mode, in particular of the transmission 60a. A third switching position of the single actuation element 18a corresponds to the second direction-of-rotation mode, in particular of the motor 54a, and to the first speed mode, in particular of the transmission 60a. Alternatively, it is conceivable for the actuation element 18a to be designed only for selection of a direction-of-rotation mode or a speed mode, and for the switching unit 16a to have at least one further actuation element, which is designed for selection of a direction-of-rotation mode or a speed mode, in particular of a mode that cannot be selected by the actuation element 18a. The actuation element 18a is realized as a rotary switch. Alternatively, it is conceivable for the actuation element 18a to be realized as a slide switch, in particular as a rotational slide switch, as a linear slide switch, as a pushbutton switch, as a toggle switch, as a contact key, or the like. The actuation element 18a has a plurality of switching positions. The actuation element 18a has at least one switching position that corresponds to the first direction-of-rotation mode, at least one switching position that corresponds to the second direction-of-rotation mode, at least one switching position that corresponds to the first speed mode, and at least one switching position that corresponds to the second speed mode. The switching position that corresponds to the first direction-of-rotation mode and the switching position that corresponds to the first speed mode are be realized by the same switching position.

The switching unit 16a is designed to switch mechanically, in particular in dependence on a switching position of the actuation element 18a, between the speed modes. The gear shift element 14a is designed to switch between the speed modes. The gear shift element 14a is operatively connected to the switching unit 16a. The gear shift element 14a is realized as a spring clamp. Alternatively, it is conceivable for the gear shift element 14a to be realized as a stud, as a pin, or the like. The gear shift element 14a is arranged at least substantially in the form of a ring around the transmission housing 62a. The gear shift element 14a projects, at least portionally, into the transmission housing 62a and the transmission 60a. The gear shift element 14a is mechanically coupled to the transmission 60a and to the switching unit 16a.

The gear shift element 14a is mechanically coupled to a switching gear wheel 68a of the transmission 60a. The switching gear wheel 68a is realized as an internal gear wheel. The gear shift element 14a is designed to displace the switching gear wheel 68a, in particular at least substantially parallel to the output axis 26a, for the purpose of switching between the speed modes. The speed modes of the drive train unit 12a are dependent on a position of the switching gear wheel 68a. The switching gear wheel 68a switches components, in particular toothed wheels, of the transmission 60a, in particular in a manner known to persons skilled in the art, as a result of a displacement of the switching gear wheel 68a. For the purpose of displacing the switching gear wheel 68a, the gear shift element 14a is mounted in a movable manner, in particular movable at least substantially parallel to the output axis 26a, on the transmission housing 62a.

The switching unit 16a has at least one displacement element 24a. The displacement element 24a is operatively connected to the actuation element 18a. The displacement element 24a is designed to switch between the speed modes in dependence on a switching position of the actuation element 18a. The displacement element 24a is directly or indirectly coupled to the drive train unit 12a. The displacement element 24a is mechanically coupled to the gear shift element 14a. The displacement element 24a is mounted in a movable manner, in particular movable at least substantially parallel to the output axis 26a, on the drive train unit 12a. The displacement element 24a is mounted in a movable manner on the transmission housing 62a. The displacement element 24a is arranged at least substantially in the form of a ring around the transmission housing 62a. The displacement element 24a is realized as a displacement ring. The displacement element 24a is mounted on, or at, a spring 70a. The spring 70a exerts a force, directed at least substantially parallel to the output axis 26a, upon the displacement element 24a. The displacement element 24a is mechanically coupled to the actuation element 18a and is displaceable, contrary to the force, by the actuation element 18a. The displacement element 24a is designed to actuate the gear shift element 14a that is operatively connected to the displacement element 24a, in particular along the output axis 26a of the drive train unit 12a, for the purpose of switching between the speed modes. The gear shift element 14a is non-positively and/or positively connected to the displacement element 24a, in particular fixed to the displacement element 24a. Alternatively or additionally, it is conceivable for the gear shift element 14a to be materially bonded to the displacement element 24a, in particular to be realized integrally with the displacement element 24a. The gear shift element 14a establishes a mechanical operative connection between the displacement element 24a and the transmission 60a, in particular the switching gear wheel 68a of the transmission 60a. The displacement element 24a actuates, in particular displaces, the gear shift element 14a as a result of an actuation of the displacement element 24a. The gear shift element 14a actuates, in particular displaces, the switching gear wheel 68a as a result of an actuation of the gear shift element 14a by the displacement element 24a. The actuation element 18a is mechanically operatively connected, via the displacement element 24a and the gear shift element 14a, to the transmission 60a, in particular to the switching gear wheel 68a. An actuation of the actuation element 18a for selection of a speed mode is transmitted to the transmission 60a, in particular the switching gear wheel 68a, via the displacement element 24a and the gear shift element 14a. The displacement element 24a displaces the gear shift element 14a at least substantially parallel to the output axis 26a, and the gear shift element 14a displaces the switching gear wheel 68a at least substantially parallel to the output axis 26a.

The displacement element 24a is mounted on the drive train unit 12a so as to be movable along the output axis 26a of the drive train unit 12a. The displacement element 24a is spring-mounted on the drive train unit 12a so as to be movable along the output axis 26a. The displacement element 24a is movably mounted, in particular spring-mounted, on the transmission housing 62a. The displacement element 24a is arranged at least substantially in the form of a ring around the drive train unit 12a, in particular around the transmission housing 62a. The displacement element 24a is mounted on, or at, the spring 70a. The spring 70a is realized as a compression spring. The spring 70a is arranged in the manner of a helical spring around the transmission housing 62a. The spring 70a is arranged on the transmission housing 62a, at least portionally, between the transmission housing 62a and the displacement element 24a. The displacement element 24a is mounted on the transmission housing 62a so as to be movable by the spring 70a along the output axis 26a. The spring 70a exerts upon the displacement element 24a a force that is at least substantially parallel to the output axis 26 and by which the displacement element 24a can be displaced along the output axis 26a. The actuation element 18a, by means of an at least portionally ramp-type realization of the actuation element 18a and of the displacement element 24a, exerts upon the displacement element 24a, at least substantially parallel to the output axis 26a, a force that acts contrary to the force exerted by the spring 70a and by which the displacement element 24a can be displaced along the output axis 26a (see FIG. 5). The displacement element 24a displaces the switching gear wheel 68a as a result of a movement along the output axis 26a, via the gear shift element 14a, and switches it between the speed modes.

The actuation element 18a is arranged at least substantially in the form of a ring around the drive train unit 12a. The actuation element 18a is arranged at least substantially in the form of a ring around the transmission housing 62a. The actuation element 18a is realized as an actuation ring, in particular as a rotary ring. The actuation element 18a is mounted on the transmission housing 62a so as to be rotatable about the output axis 26a. Preferably, the actuation element 18a and the displacement element 24a, in at least one switching position of the actuation element 18a, bear against each other, as viewed along the output axis 26a, at least substantially in a form-precise manner (see FIG. 4). The actuation element 18a and the displacement element 24a, in at least one switching position of the actuation element 18a, are arranged at least portionally spaced apart from each other on the transmission housing 62a, as viewed along the output axis 26a (see FIG. 5). The actuation element 18a, when the switching unit 16a has been mounted in the power tool 32a, is arranged at least substantially completely within a housing unit 34a of the power tool 32a. The actuation element 18a comprises an actuation extension 72a for actuating the actuation element 18a. The actuation extension 72a, when the switching unit 16a is in a mounted state, projects at least portionally out of the housing unit 34a of the power tool 32a, in particular through an actuation recess 74a of the housing unit 34a (see FIG. 4).

FIG. 3 shows a part of the power tool device 10a in a perspective representation. The drive train unit 12a, the actuation element 18a and the displacement element 24a are represented. The power tool device 10a comprises the switching element 20a. The power tool device 10a comprises an electronics unit 76a. The electronics unit 76a has a printed circuit board 78a. The switching element 20a is arranged on the printed circuit board 78a, in particular fixed on the printed circuit board 78a. The switching element 20a is designed to switch between the direction-of-rotation modes in dependence on a switching position of the actuation element 18a. The switching element 20a is designed to switch electronically between the direction-of-rotation modes. Alternatively or additionally, it is conceivable for the switching element 20a to be designed to switch, in particular electronically, between the speed modes. The switching element 20a is designed, in the switching position of the actuation element 18a corresponding to the first direction-of-rotation mode, to switch the transmission 60a and/or the motor 54a, in particular electronically, to the first direction-of-rotation mode. The switching element 20a is designed, in the switching position of the actuation element 18a corresponding to the second direction-of-rotation mode, to switch the transmission 60a and/or the motor 54a, in particular electronically, to the second direction-of-rotation mode. The switching element 20a is electronically and mechanically connected to the electronics unit 76a of the power tool device 10a. There may be arranged on the printed circuit board 78a, for example, a microprocessor, an integrated circuit, an electronic circuit, or the like, which are not represented further, for reasons of clarity. The switching element 20a is electrically, or electronically, connected to the printed circuit board 78a.

The switching element 20a is designed to sense a switching position of the actuation element 18a and, in dependence on the sensed switching position of the actuation element 18a, to provide the electronics unit 76a with a signal, in particular an electronic signal, for switching the direction-of-rotation mode. The electronics unit 76a switches the transmission 60a and/or the motor 54a to the corresponding direction-of-rotation mode in dependence on the signal of the switching element 20a. The electronics unit 77a switches the motor 54a to the corresponding direction-of-rotation mode. The electronics unit 76a matches an electrical polarity of the motor 54a to a selected direction-of-rotation mode in dependence on the signal of the switching element 20a. Alternatively, it is conceivable for the power tool device 10a to have a mechanism, in particular a mechanical mechanism, that switches the transmission 60a, in particular by means of the gear shift element 14a, to the corresponding direction-of-rotation mode in dependence on a sensed switching position of the actuation element 18a, in particular in dependence on a signal of the switching element 20a. The switching element is designed to contactlessly sense a switching position of the switching element 18a. The switching element 20a may sense a position of the actuation element 18a and/or a position of an activation element 22a of the switching unit 16a that is coupled to the actuation element 18a, in particular at least partially arranged on the actuation element 18a, for the purpose of sensing the switching position of the actuation element 18a. The switching element 20a is realized as a sensor.

The switching unit 16a comprises at least one activation element 22a, which is assigned to the actuation element 18a. The activation element 22a is designed to actuate the switching element 20a. The activation element 22a is designed to actuate the switching element 20a for the purpose of sensing a switching position of the actuation element 18a. The activation element 22a is at least operatively connected to the actuation element 18a. The activation element 22a is at least non-positively and/or positively fixed to the actuation element 18a. Alternatively, it is conceivable for the activation element 22a to be connected to the actuation element 18a in a materially bonded manner, in particular to be realized integrally with the actuation element 18a. The activation element 22a may be at least partially integrated into the actuation element 18a. The actuation element 18a may be realized, at least partially, as an activation element 22a, or perform a function of an activation element 22a. The activation element 22a may also be realized separately from the actuation element 18a. The switching unit 16a may have a plurality of activation elements 22a, of which at least one activation element 22a is realized separately from the actuation element 18a. The activation element 22a may be realized as a plurality of parts, in which case at least a part of the activation element 22a is fixed to the actuation element 18a and at least a further part of the activation element 22a is realized separately from the actuation element 18a. The activation element 22a is designed for contactless actuation of the switching element 20a. The activation element 22a switches the switching element 20a differently in different positions of the activation element 22a. A position of the activation element 22a is dependent on, in particular is proportional to, a switching position of the actuation element 18a. Different positions of the activation element 22a correspond to different direction-of-rotation modes.

The activation element 22a is designed for contactless, in particular magnetic, actuation of the switching element 20a. For the purpose of magnetic actuation of the switching element 20a, the activation element 22a is at least partially magnetic. The activation element 22a is realized as a magnet. The actuation element 18a is realized as a permanent magnet, for example of iron, cobalt, nickel, or the like. Alternatively, it is conceivable for the activation element 22a to be realized as an electromagnet, for example in the form of a coil. It is conceivable for the actuation element 18a, for the purpose of realizing the activation element 22a, to be at least partially magnetic. Alternatively, it is conceivable for the activation element 22a to be designed for contactless actuation of the switching element 20a other than by magnetic actuation of the switching element 22a, for example for optical, thermal, capacitive or other actuation of the switching element 20a considered appropriate by persons skilled in the art. For the purpose of optically actuating the switching element 20a, the activation element 22a may be realized as a light source, as a light absorber, or the like. For the purpose of thermally actuating the switching element 20a, the activation element 22a may be realized as a heat source, as a low-temperature source, or the like. For the purpose of capacitively actuating the switching element 20a, the activation element 22a may be realized as an electrode, as a dielectric, or the like. The activation element 22a is arranged on a side 80a of the actuation element 18a that faces toward the switching element 20a in at least one switching position of the actuation element 18a. Alternatively, it is conceivable for the activation element 22a to at least partially realize the side 80a of the actuation element 18a. A position of the activation element 22a facing toward the switching element 20a and a position of the activation element 22a facing away from the switching element 20a correspond to two different switching positions of the actuation element 18a and to two different direction-of-rotation modes, in particular to the first direction-of-rotation mode and the second direction-of-rotation mode, respectively.

The switching element 20a is realized as a sensor. The switching element 20a is realized as a magnet sensor. The switching element 20a is realized as a Hall sensor. Alternatively, it is conceivable for the switching element 20a to be realized as an optical sensor, for example as a light barrier, as a brightness sensor, as a laser scanner, or the like, as a thermal sensor, in particular as a temperature sensor, as a capacitive sensor, or as another sensor considered appropriate by persons skilled in the art. The switching element 20a is realized as a contactless sensor. The switching element 20a can be supplied with electrical energy and/or operated by the battery unit 40a of the power tool 32a, in particular via the electronics unit 76a. The switching element 20a senses a magnetic field strength, the magnitude of which is dependent on a switching position of the actuation element 18a. Different sensed magnetic field strengths correspond to different switching positions of the actuation element 18a. The magnetic field strength originates from the magnetic activation element 22a of the switching unit 16a. The switching element 20a, in dependence on the sensed magnetic field strength, provides the electronics unit 76a with an electrical, or electronic signal. In dependence on the electrical, or electronic signal, the electronics unit 76a switches the transmission 60a and/or the motor 54a to a corresponding direction-of-rotation mode.

FIG. 4 shows a first switching position of the actuation element 18a of the switching unit 16a of the power tool device 10a, in a schematic top view. The top side 58a of the power tool 32a and the power tool device 10a are represented. Shown on the left side is a user's view of the power tool 32a. Shown on the right side is the power tool device 10a, in particular positions of individual components of the power tool device 10a in dependence on a switching position of the actuation element 18a. The actuation element 18a comprises the actuation extension 72a, which projects at least partially out of the actuation recess 74a of the housing unit 34a. The actuation element 18a can be rotated about the output axis 26a by means of the actuation extension 72a. The actuation element 18a is in a first switching position. The first switching position of the actuation element 18a corresponds to the first direction-of-rotation mode and to the second speed mode. The actuation extension 72a bears against a first end stop 82a of the actuation recess 74a. For the purpose of actuating the displacement element 24a, the actuation element 18a and/or the displacement element 24a are/is realized at least portionally in the manner of a ramp. For the purpose of actuating the displacement element 24a, the actuation element 18a and the displacement element 24a are realized at least portionally in the manner of a ramp. The at least portionally ramp-type realization of the actuation element 18a and/or of the displacement element 24a is designed to convert a rotational movement of the actuation element 18a into a translational movement of the displacement element 24a, at least substantially parallel to the output axis 26a. The displacement element 24a has at least one ramp-type opening 84a. The displacement element 24a has the ramp-type opening 84a on a side of the displacement element 24a that faces toward the actuation element 18a. The actuation element 18a has at least one ramp-type extension. The actuation element 18a has the ramp-type extension 86a on a side of the actuation element 18a that faces toward the displacement element 24a. Preferably, the ramp-type extension 86a, in at least one switching position of the actuation element 18a, engages, at least substantially in a form-precise manner, in the ramp-type opening 84a. The ramp-type extension 86a, in the first switching position of the actuation element 18a, engages at least substantially in a form-precise manner in the ramp-type opening 84a. The displacement element 24a is pressed against the actuation element 18a by force of the spring 70a acting along a first direction 88a at least substantially parallel to the output axis 26a.

Figure 5:
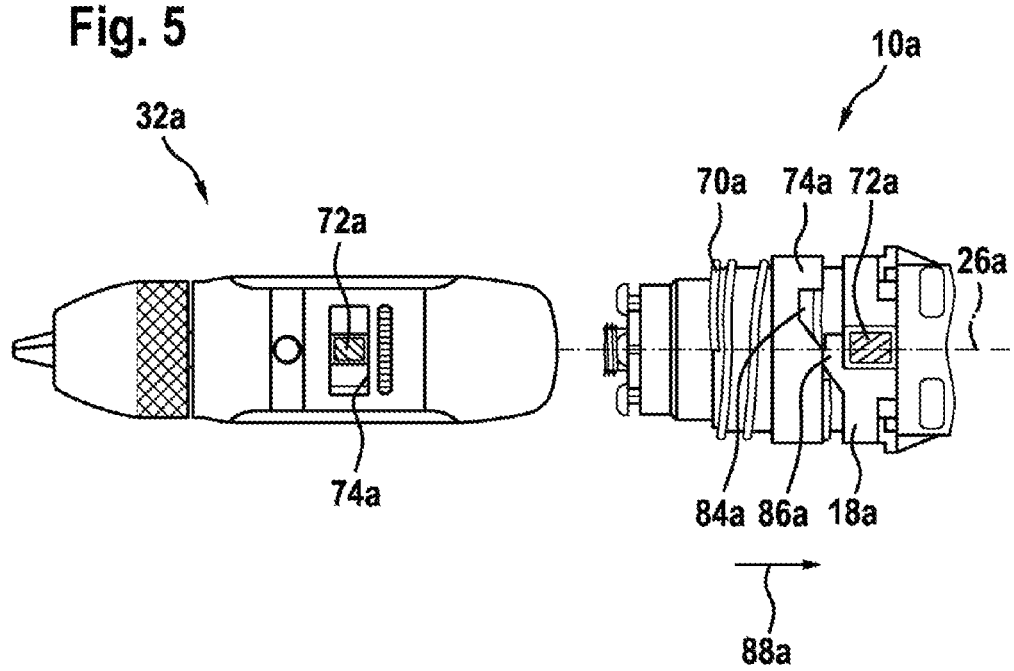

FIG. 5 shows a second switching position of the actuation element 18a of the switching unit 16a of the power tool device 10a, in a schematic top view. A representation is at least substantially similar to a representation of FIG. 4. The actuation element 18a is in a second switching position. The second switching position of the actuation element 18a corresponds to the first direction-of-rotation mode and to the first speed mode. The actuation extension 72a is in a central position in the actuation recess 74a. In comparison with a position of the displacement element 24a in FIG. 4, the displacement element 24a is displaced contrary to the first direction 88a, at least substantially parallel to the output axis 26a. By means of the ramp-type opening 84a, the displacement element 24a can slide along the ramp-type extension 86a, at least substantially perpendicularly in relation to a direction of rotation of the actuation element 18a. The displacement element 24a is pushed, by the ramp-type opening 84a and by the ramp-type extension 86a, contrary to the force exerted upon the displacement element 24a by the spring 70a on which, or at which, the displacement element 24a is mounted. The displacement element 24a is pushed, by the ramp-type opening 84a and by the ramp-type extension 86a, as a result of a partial rotation of the actuation element 18a about the output axis 26a, contrary to the force exerted upon the displacement element 24a by the spring 70a. In the second switching position of the actuation element 18a, the ramp-type extension 86a is pushed at least partially, preferably completely, out of the ramp-type opening 84a. As a result of the displacement of the displacement element 24a along the output axis 26a, the gear shift element 14a and the switching gear wheel 68a are displaced, in comparison with the switching position of the actuation element 18a in FIG. 4, at least substantially parallel to the output axis 26a. The transmission 60a, in comparison with a state in FIG. 4, is in a different speed mode.

Figure 6:
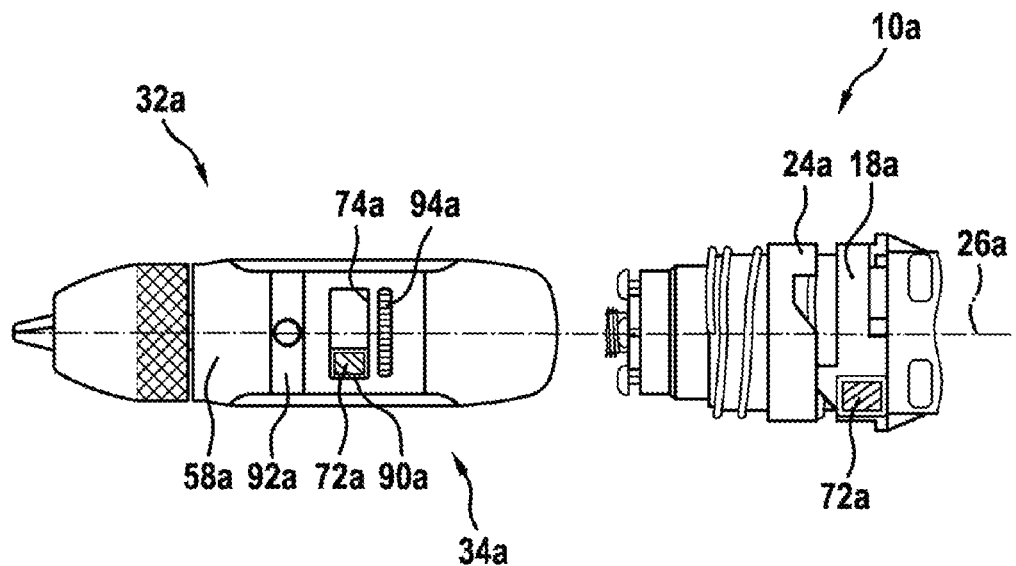

FIG. 6 shows a third switching position of the actuation element 18a of the switching unit 16a of the power tool device 10a, in a schematic top view. A representation is at least substantially similar to a representation of FIGS. 4 and 5. The actuation element 18*a* is in a third switching position. The third switching position of the actuation element 18*a* corresponds to the second direction-of-rotation mode and to the first speed mode. The actuation extension 72*a* bears against a second end stop 90*a* of the actuation recess 74*a*. The displacement element 24*a* is in the same position as in FIG. 5. The gear shift element 14*a* and the switching gear wheel 68*a* are in the same position as in FIG. 5. The transmission 60*a* is in the same speed mode as in FIG. 5. The actuation element 18*a*, in comparison with the second switching position of the actuation element 18*a*, is rotated further about the output axis 26*a*. In the third switching position of the actuation element 18*a*, the activation element 22*a* actuates the switching element 20*a*. In the third switching position of the actuation element 18*a*, the switching element 20*a* switches the transmission 60*a* and/or the motor 54*a*, in particular electronically, to the second direction-of-rotation mode.

The housing unit 34*a* has an identification element 92*a*. The identification element 92*a* is provided at least for identification of the power tool 32*a*. The identification element is arranged on the top side 58*a* of the power tool 32*a*. The identification element 92*a* extends at least substantially parallel to the actuation recess 74*a*. The identification element 92*a* extends at least substantially perpendicularly in relation to the output axis 26*a*. The housing unit 34*a* has a ventilation opening 94*a*. The ventilation opening 94*a* is designed to discharge air, in particular provided to cool the motor 54*a*, from the housing unit 34*a*. The ventilation opening 94*a* is arranged on the top side 58*a* of the power tool 32*a*. The ventilation opening 94*a* extends at least substantially parallel to the actuation recess 74*a*. The ventilation opening 94*a* extends at least substantially perpendicularly in relation to the output axis 26*a*. The actuation recess 74*a* is arranged between the identification element 92*a* and the ventilation opening 94*a*, as viewed along the output axis 26*a*.

Figure 7:
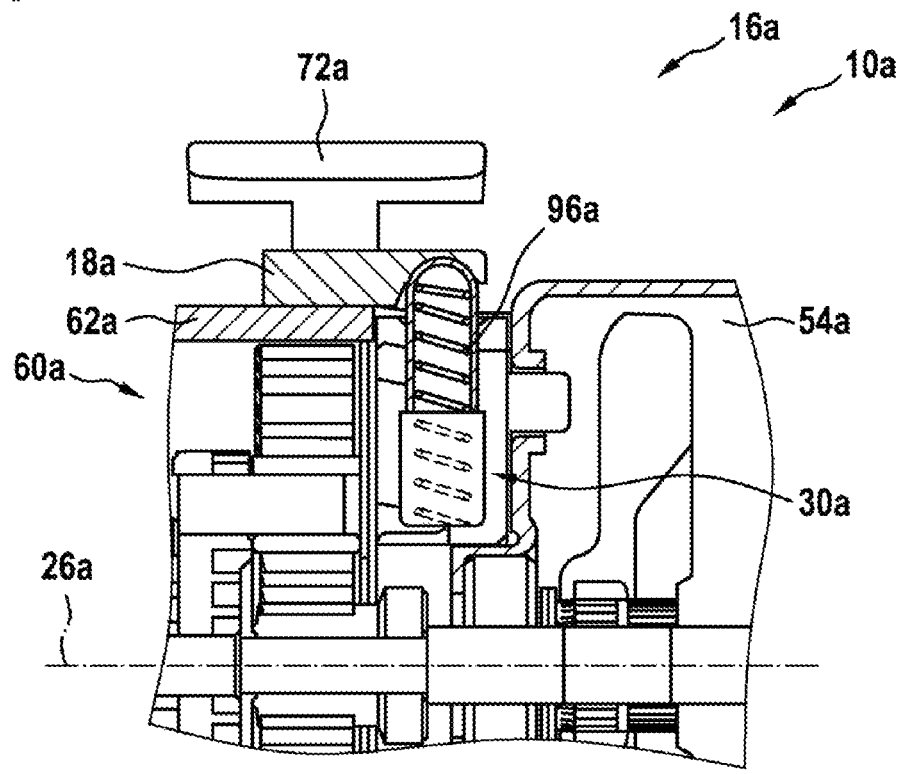

FIG. 7 shows a part of the power tool device 10*a* in a schematic sectional representation. A part of the transmission 60*a* and a part of the motor 54*a* are shown. The actuation element 18*a* is mounted on the transmission housing 62*a*. The switching unit 16*a* has at least one output unit 30*a*. The output unit 30*a* is designed for optical, acoustic and/or haptic output in dependence on an actuation and/or switching position of the actuation element 18*a*. In the present exemplary embodiment, the output unit 30*a* is designed for haptic output. The output unit 30*a* is arranged at least partially on the actuation element 18*a*. The output unit 30*a* has a latching spring element 96*a*. Alternatively or additionally, it is conceivable for the output unit 30*a*, for the purpose of haptic output, to have a vibration motor that is designed to output different vibrations, vibration sequences, vibration durations, or the like, in dependence on different switching positions of the actuation element 18*a*. The latching spring element 96*a* is arranged at least substantially radially in relation to the output axis 26*a*. The latching spring element 96*a* is arranged at least partially within the transmission housing 62*a*. The latching spring element 96*a* is designed to exert upon the actuation element 18*a* a force that is directed at least substantially radially away from the output axis 26*a*. The actuation element 18*a* has at least one latching recess which, in at least one switching position of the actuation element 18*a*, can be latched, in particular separably, with the latching spring element 96*a*. The latching recess can be latched with a spring-actuated latching bolt of the latching spring element 96*a*. The actuation element 18*a* has a plurality of latching recesses, one latching recess in each case representing respectively one switching position of the actuation element 18*a*. A latching of the latching spring element 96*a* with a latching recess, in particular upon an actuation of the actuation element 18*a*, can be perceived haptically. As an alternative or in addition to a haptic output, it is conceivable for the output unit 30*a* to be designed for acoustic output. For the purpose of acoustic output, the output unit 30*a* may have at least one loudspeaker. The loudspeaker is designed to output different tones, tone sequences, tone numbers, announcements, or the like, in dependence on different switching positions of the actuation element.

A further exemplary embodiment of the disclosure is shown in FIGS. 8 to 15. The descriptions and the drawings that follow are limited substantially to the differences between the exemplary embodiments, and in principle reference may also be made to the drawings and/or the description of the other exemplary embodiment, in particular of FIGS. 1 to 7, in respect of components that have the same designation, in particular in respect of components denoted by the same references. To distinguish the exemplary embodiments, the letter a has been appended to the references of the exemplary embodiment in FIGS. 1 to 7. In the exemplary embodiment of FIGS. 8 to 15, the letter a has been replaced by the letter b.

Figure 8:
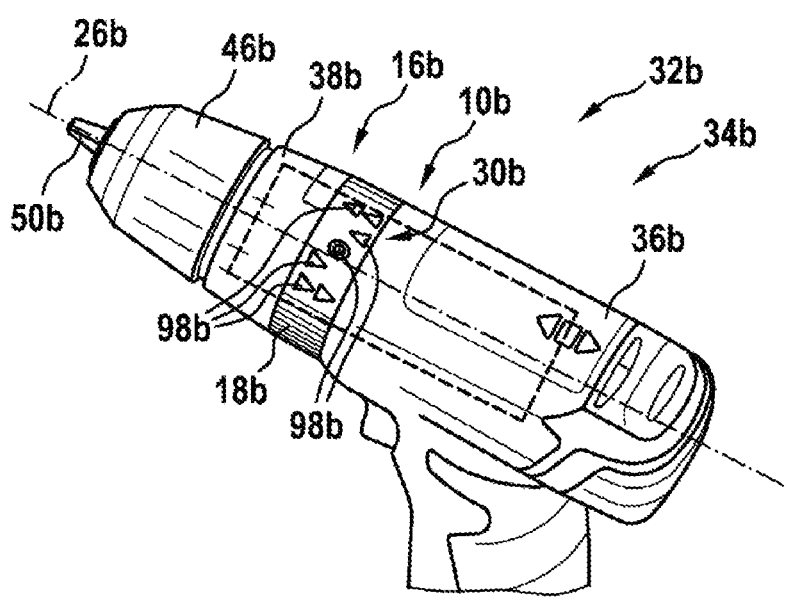

FIG. 8 shows an alternative power tool 32*b*, in a perspective representation. The power tool 32*b* comprises a housing unit 34*b*, a tool receiver 46*b* and an insert tool 50*b*. The power tool 32*b* comprises a power tool device 10*b*. The power tool device 10*b* is arranged, at least partially, within the housing unit 34*b*. The power tool device 10*b* has a switching unit 16*b*. The switching unit 16*b* comprises an actuation element 18*b*. The switching unit 16*b* comprises a single actuation element 18*b*. The actuation element 18*b* is arranged between a first housing shell element 36*b* and a second housing shell element 38*b* of the housing unit 34*b*. The actuation element 18*b* is arranged at least substantially in the form of a ring around a drive train unit 12*b* of the power tool device 10*b* (see FIG. 12). The actuation element 18*b* is arranged at least substantially in the form of a ring around an output axis 26*b* of the switching unit 16*b*. The actuation element 18*b* is realized as a rotary switch.

The switching unit 16*b* has an output unit 30*b*. The output unit 30*b* is designed for optical output in dependence on an actuation and/or switching position of the actuation element 18*b*. The output unit 30*b* is arranged on the actuation element 18*b*. The output unit 30*b* has at least one display element 98*b* for optical output. The output unit 30*b* has five display elements 98*b*. The display elements 98*b* are realized as static display elements 98*b*. A static display element 98*b* represents at least one direction-of-rotation mode and/or speed mode. The static display elements 98*b* are realized as symbols. Two of the display elements 98*b* are realized as double arrows. One of the display elements 98*b* is realized as a circle. One display element 98*b*, realized as an arrow pointing in the direction of the insert tool 50*b*, represents the first direction-of-rotation mode and the first speed mode. One display element 98*b*, realized as an arrow pointing away from the insert tool 50*b*, represents the second direction-of-rotation mode and the first speed mode. One display element 98*b*, realized as a double arrow pointing in the direction of the insert tool 50*b*, represents the first direction-of-rotation mode and the second speed mode. One display element 98*b*, realized as a double arrow pointing away from the insert tool 50*b*, represents the second direction-of-rotation mode and the second speed mode. One display element 98*b*, realized as a circle, represents a neutral position of the actuation element 18b. Alternatively, it is conceivable for the actuation element 18b to be realized without a neutral position. The display elements 98b are arranged on the actuation element 18b according to different switching positions of the actuation element 18b. The display elements 98b are imprinted on the actuation element 18b.

Figure 9:
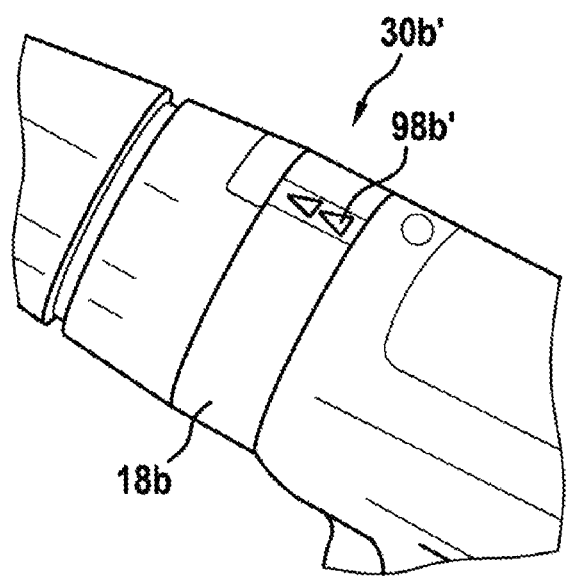

FIG. 9 shows a first alternative of an output unit 30b', in a perspective representation. The output unit 30b' has display elements 98b', which are realized in a manner similar to the display elements 98b of the output unit 30b from FIG. 8. The output unit 30b' is realized in such a manner that only one of the display elements 98b', corresponding to a switching position of the actuation element 18b, is displayed. In FIG. 9, a display element 98b', realized as a double arrow pointing in the direction of the insert tool 50b, is represented as an example.

Figure 10:
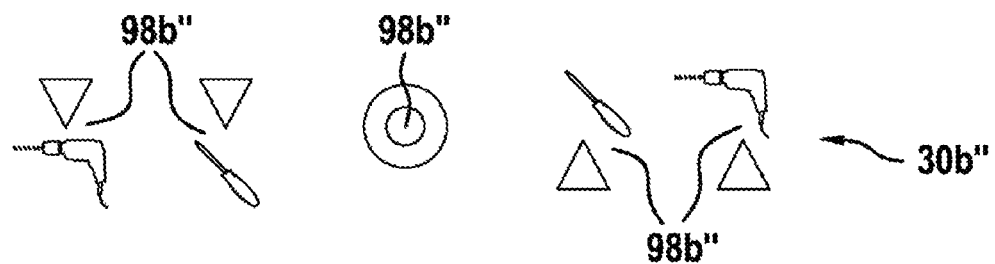

FIG. 10 shows a second alternative of an output unit 30b", in a schematic representation. The output unit 30b" has five display elements 98b". Represented in FIG. 10 are symbols that can be applied to, in particular imprinted on, the actuation element 18b. Two of the display elements 98b" are realized as arrows in combination with a schematic screwdriver. Two of the display elements 98b" are realized as arrows in combination with a schematic power drill. One of the display elements 98b" is realized as a circle. One display element 98b", realized as an arrow pointing in the direction of the insert tool 50b in combination with a schematic screwdriver, represents the first direction-of-rotation mode and the first speed mode. One display element 98b", realized as an arrow pointing away from the insert tool 50b in combination with a schematic screwdriver, represents the second direction-of-rotation mode and the first speed mode. One display element 98b", realized as an arrow pointing in the direction of the insert tool 50b in combination with a schematic power drill, represents the first direction-of-rotation mode and the second speed mode. One display element 98b", realized as an arrow pointing away from the insert tool 50b in combination with a schematic power drill, represents the second direction-of-rotation mode and the second speed mode. One display element 98b", realized as a circle, represents a neutral position of the actuation element 18b.

Figure 11:
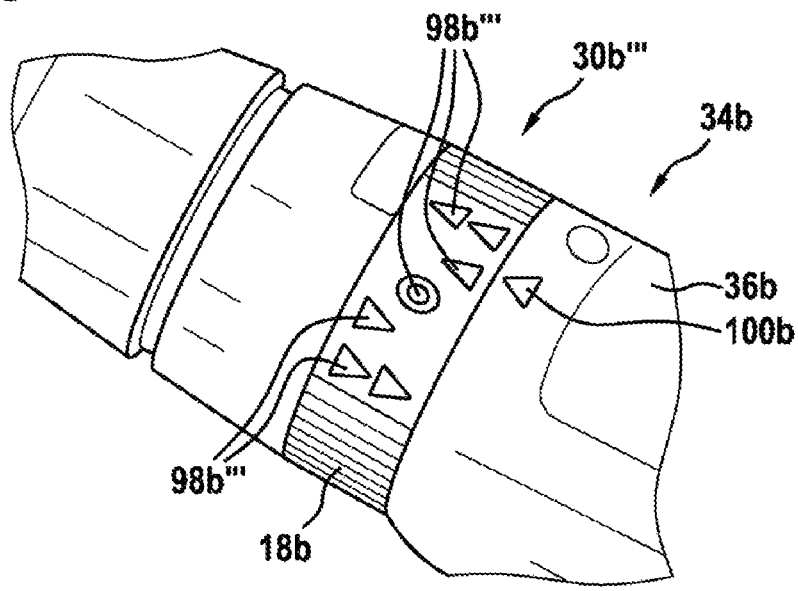

FIG. 11 shows a third alternative of an output unit 30b''', in a perspective representation. The output unit 30b''' comprises five display elements 98b'''. The display elements 98b''' are realized in a manner at least substantially similar to the display elements 98b of the output unit 30b represented in FIG. 8. The display elements 98b''' are arranged in a manner at least substantially similar to the display elements 98b of the output unit 30b represented in FIG. 8. The output unit 30b''' has a further display element 100b. The further display element 100b is realized as a dynamic display element 100b. The further display element 100b is realized as an LED. Alternatively, it is conceivable for the further display element 100b to be realized as a display screen, or the like. The further display element 100b has an arrow shape. The further display element 100b is integrated, at least partially, into the housing unit 34b, in particular into the first housing shell element 36b. The further display element 100b is designed to represent different symbols, colors, flashing speeds, or the like, in dependence on different switching positions of the actuation element 18b. It is conceivable for the output unit 30b''' to be realized without the display elements 98b''', and to comprise only at least one further display element 100b.

Figure 12:
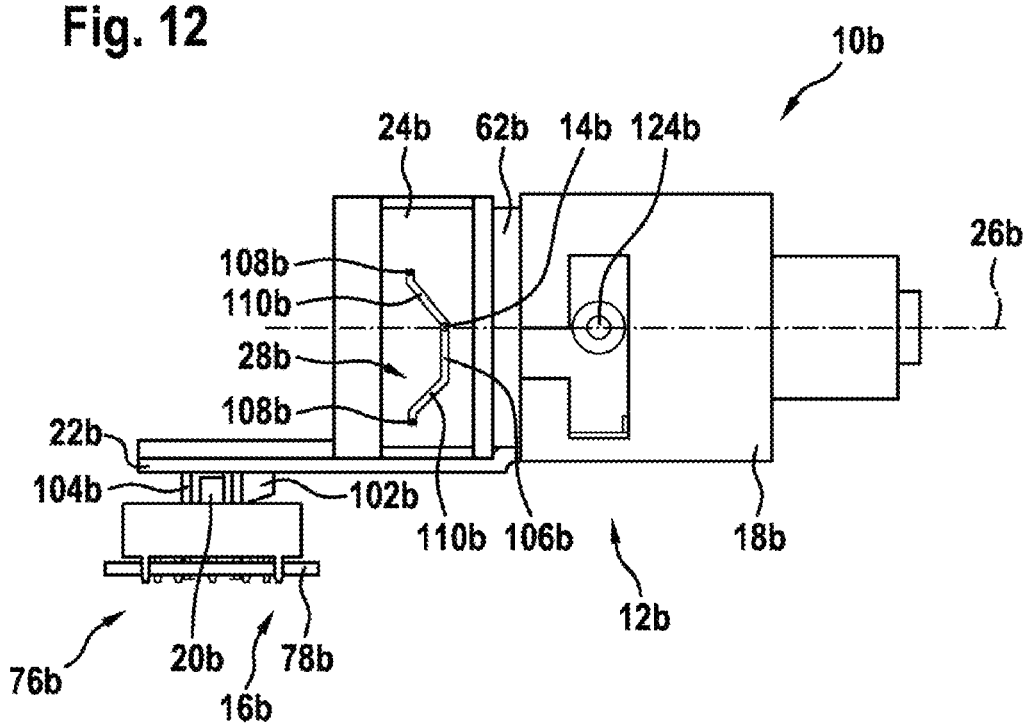

FIG. 12 shows the power tool device 10b in a schematic representation. The power tool device 10b comprises the drive train unit 12b and the switching unit 16b. The actuation element 18b is arranged on the transmission housing 62b. The actuation element 18b is represented in a simplified form, in comparison with the preceding figures. A displacement element 24b of the switching unit 16b is arranged on the transmission housing 62b. The displacement element 24b is connected at a fixed distance, in particular along the output axis 26b, to the actuation element 18b via an activation element 22b of the switching unit 16b. The switching element 20b is electrically connected to an electronics unit 76b of the power tool device 10b. The switching element 20b is arranged on a printed circuit board 78b of the electronics unit 76b.

The activation element 22b is designed for mechanical actuation of the switching element 20b. The activation element 22b is realized as a switching rod. Alternatively, it is conceivable for the activation element 22b to be realized as a switching button, as an activation extension, in particular of the actuation element 18b, or the like. The activation element 22b is designed to displace the switching element 20b for the purpose of mechanical actuation. The activation element 22b is designed to displace the switching element 20b at least substantially parallel to the output axis 26b. Alternatively, it is conceivable for the activation element 22b to be designed to press, tilt, rotate, etc. the switching element 20b for the purpose of mechanical actuation. The activation element 22b has a first switching extension 102b and a second switching extension 104b. The switching element 20b, in at least one switching position of the actuation element 18b, is arranged between the first switching extension 102b and the second switching extension 104b. The first switching extension 102b and the second switching extension 104b are arranged on a side of the activation element 22b that faces away from the transmission housing 62b. The first switching extension 102b and the second switching extension 104b are realized integrally with the activation element 22b. Alternatively, it is conceivable for the first switching extension 102b and/or the second switching extension 104b to be materially bonded, non-positively and/or positively connected, or the like, to the activation element 22b. The first switching extension 102b and the second switching extension 104b are aligned at least substantially parallel to each other, and arranged spaced apart from each other as viewed along the output axis 26b. The first switching extension 102b and the second switching extension 104b extend at an angle in relation to the output axis 26b. The first switching extension 102b or the second switching extension 104b actuates the switching element 20b in dependence on a switching position of the actuation element 18b. The activation element 22b is arranged on a side of the actuation element 18b that faces toward the switching element 20b in at least one switching position of the actuation element 18b.

The switching element 20b is realized as a mechanical switch. Alternatively, it is conceivable for the switching element 20b to be realized as a signal switch. As an alternative to being realized as a sensor, in particular as a Hall sensor, the switching element 20b is realized as a mechanical switch. It is conceivable for the switching unit 16b to have at least one further switching element, realized as a sensor, in particular as a Hall sensor, and the switching element 20b realized as a mechanical switch, in particular for redundant switching between the direction-of-rotation modes. The switching element 20b is realized as a slide switch. Alternatively, it is conceivable for the switching element 20b to be realized as a pushbutton switch, as a rocker switch, as a rotary switch, as a toggle switch, or the like. The switching element 20*b* can be actuated mechanically by the activation element 22*b* for the purpose of switching between the direction-of-rotation modes. The switching element 20*b* has a plurality of switching levels, in particular corresponding to the switching positions of the actuation element 18*b*. The switching element 20*b* has a first switching level corresponding to a first direction-of-rotation mode, a second switching level corresponding to a second direction-of-rotation mode, and a third switching level corresponding to a neutral position of the actuation element 18*b*. The switching element 20*b* can be actuated differently in different switching positions of the actuation element 18*b*, in particular can be switched to different switching levels. The activation element 22*b*, in particular the first switching extension 102*b* and/or the second switching extension 104*b*, can actuate the switching element 20*b* differently according to different switching positions of the actuation element 18*b*, in particular can switch it to different switching levels. The switching element 20*b* provides the electronics unit 76*b* with an electrical, or electronic, signal in dependence on the switching level. The electronics unit 76*b*, in dependence on the electrical, or electronic, signal, switches the transmission 60*b* and/or the motor 54*b* of the drive train unit 12*b* to a corresponding direction-of-rotation mode.

The displacement element 24*b* is mounted on the transmission housing 62*b* so as to be rotatable about the output axis 26*b*. The displacement element 24*b* is arranged at least substantially in the form of a ring a round the transmission housing 62*b*. The displacement element 24*b* is designed to actuate a gear shift element 14*b* of the drive train unit 12*b*, along the output axis 26*b*, for the purpose of switching between the speed modes.

The gear shift element 14*b* is realized as a bolt. The gear shift element 14*b* is operatively connected to a switching gear wheel 68*b* of the transmission 60*b*. The displacement element 24*b* has at least one shift gate 28*b*. The shift gate 28*b* is designed to actuate the gear shift element 14*b*, in particular along the output axis 26*b* of the drive train unit 12*b*. The shift gate 28*b* is realized as an at least substantially slot-type recess in the displacement element 24*b*. The shift gate 28*b* extends at least along a partial circumference of the displacement element 24*b*. The shift gate 28*b* comprises a first portion 106*b* extends at least substantially perpendicularly in relation to the output axis 26*b*. The shift gate 28*b* comprises at least one second portion 108*b* that is arranged, offset from the first portion 106*b*, along the output axis 26*b*. The shift gate 28*b* comprises two second portions 108*b*. The second portions 108*b* extend at least substantially perpendicularly in relation to the output axis 26*b*. The shift gate comprises two third portions 110*b*, which extend at an angle in relation to the output axis 26*b*. In each case one of the three portions 110*b* connects respectively one of the second portions 108*b* to the first portion 106*b*.

The displacement element 24*b* is mounted on the transmission housing 62*b* so as to be at least substantially immovable along the output axis 26*b*. The gear shift element 14*b* is arranged, at least portionally, in the shift gate 28*b*. The gear shift element 14*b* extends, at least portionally, at least substantially perpendicularly in relation to the output axis 26*b*, in the shift gate 28*b*. The shift gate 28*b* has a width that corresponds at least substantially to a diameter of the gear shift element 14*b*. The shift gate 28*b* is designed to displace the gear shift element 14*b*. The shift gate 28*b* is designed to displace the gear shift element 14*b* as a result of a rotational movement of the displacement element 24*b* about the output axis 26*b*, at least substantially parallel to the output axis 26*b*. As a result of a rotational movement of the displacement element 24*b*, the gear shift element 14*b* slides within and along the shift gate 28*b*, in particular following a shaping of the shift gate. As a result of a rotation of the displacement element 24*b*, the gear shift element 14*b* is displaced at least between the first portion 106*b* of the shift gate 28*b* and the second portions 108*b* of the shift gate 28*b*, in particular via the third portions 110*b* of the shift gate 28*b*. A displacement of the gear shift element 14*b* between the first portion 106*b* of the shift gate 28*b* and a second portion 108*b* of the shift gate 28*b* corresponds to a displacement of the gear shift element 14*b* and of the switching gear wheel 68*b* along the output axis 26*b*. A position of the gear shift element 14*b* in the first portion 106*b* of the shift gate 28*b* corresponds to the second speed mode. A position of the gear shift element 14*b* in the second portion of the shift gate 28*b* corresponds to the first speed mode. The displacement element 24*b* rotates about the output axis 26*b* as a result of a rotation of the actuation element 18*b* about the output axis 26*b*. The displacement element 24*b* is mechanically connected to the actuation element 18*b* via the activation element 22*b*.

Figure 13:
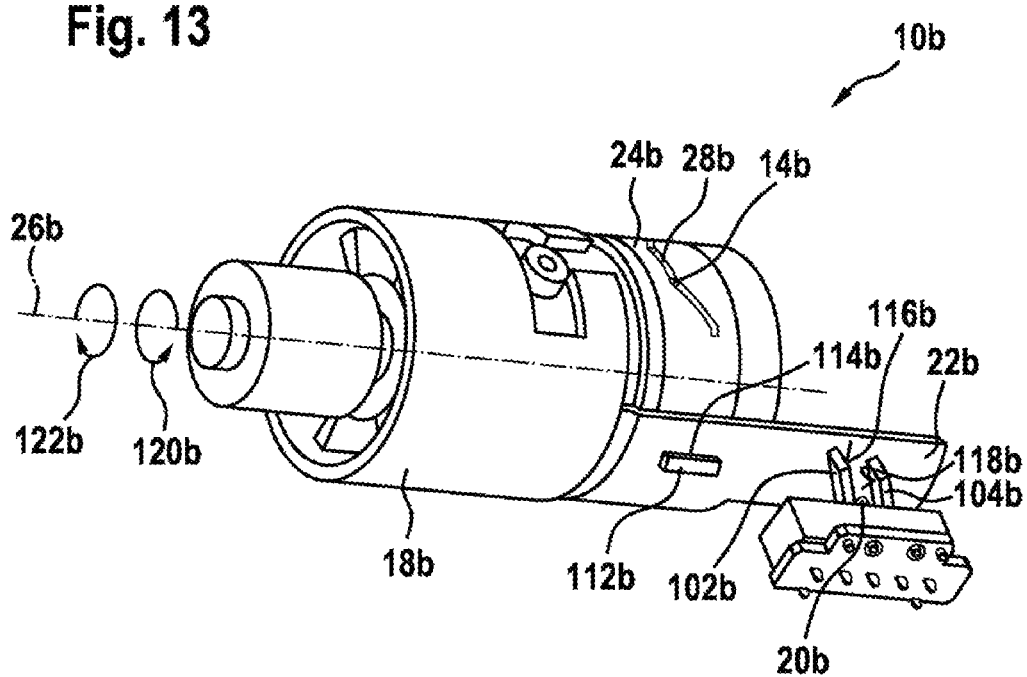

FIG. 13 shows the power tool device 10*b* in a perspective representation. The displacement element 24*b* has a fastening extension 112*b*. The fastening extension 112*b* is arranged on the displacement element 24*b*, on a side of the switching element 20*b* that faces toward the activation element 22*b*. The fastening extension 112*b* engages in a fastening recess 114*b* of the activation element 22*b*. The activation element 22*b* is non-positively and/or positively fixed to the displacement element 24*b* via the fastening recess 114*b* and the fastening extension 112*b*. Alternatively, it is conceivable for the activation element 22*b* to be fixed in a materially bonded manner to the displacement element 24*b*, or to be realized integrally with the displacement element 24*b*. The activation element 22*b* couples the displacement element 24*b* to the actuation element 18*b* via the fastening recess 114*b* and the fastening extension 112*b*. A rotation of the actuation element 18*b* is transmitted to the displacement element 24*b* via the activation element 22*b*. A rotation of the actuation element 18*b* by a certain angle corresponds to a rotation of the displacement element 24*b* by the same angle. A simultaneous rotation of the activation element 22*b* and of the displacement element 24*b*, as a result of an actuation of the actuation element 18*b*, causes switching to be effected simultaneously between the direction-of-rotation modes and the speed modes. The displacement element 24*b* switches between the speed modes by means of the shift gate 28*b*, via the gear shift element 14*b*. The activation element 22*b* switches the direction-of-rotation modes by means of the first switching extension 102*b* and/or by means of the second switching extension 104*b*, via the switching element 20*b*.

As a result of a rotation of the activation element 22*b*, the switching element 20*b* slides along an inner surface 116*b* of the first switching extension 102*b* or along an inner surface 118*b* of the second switching extension 104*b*. Owing to the first switching extension 102*b* and the second switching extension 104*b* being arranged at an angle in relation to the output axis 26*b*, the first switching extension 102*b* and the second switching extension 104*b* act as ramps. The first switching extension 102*b* and the second switching extension 104*b* convert a rotational movement of the actuation element 18*b*, and of the activation element 22*b* coupled to the actuation element 18*b*, about the output axis 26*b* into a translation movement of the switching element 20*b* at least substantially parallel to the output axis 26*b*. As a result of a rotational movement of the actuation element 18*b*, and of the activation element 22*b* coupled to the actuation element 18*b*, along a first direction of rotation 120b, about the output axis 26b, the switching element 20b slides along the inner surface 116b of the first switching extension 102b, and is displaced by the first switching extension 102b, at least substantially parallel to the output axis 26b, in the direction of the second switching extension 104b. As a result of a rotational movement of the actuation element 18b along the first direction of rotation 120b, about the output axis 26b, the transmission 60b and/or the motor 54b are/is switched to the first direction-of-rotation mode. As a result of a rotational movement of the actuation element 18b, and of the activation element 22b coupled to the actuation element 18b, along a second direction of rotation 122b that is opposite to the first direction of rotation 120b, about the output axis 26b, the switching element 20b slides along the inner surface 118b of the second switching extension 104b, and is displaced by the second switching extension 104b, at least substantially parallel to the output axis 26b, in the direction of the first switching extension 102b. As a result of a rotational movement of the actuation element 18b along the second direction of rotation 122b, about the output axis 26b, the transmission 60b and/or the motor 54b are/is switched to the second direction-of-rotation mode.

Figure 14:
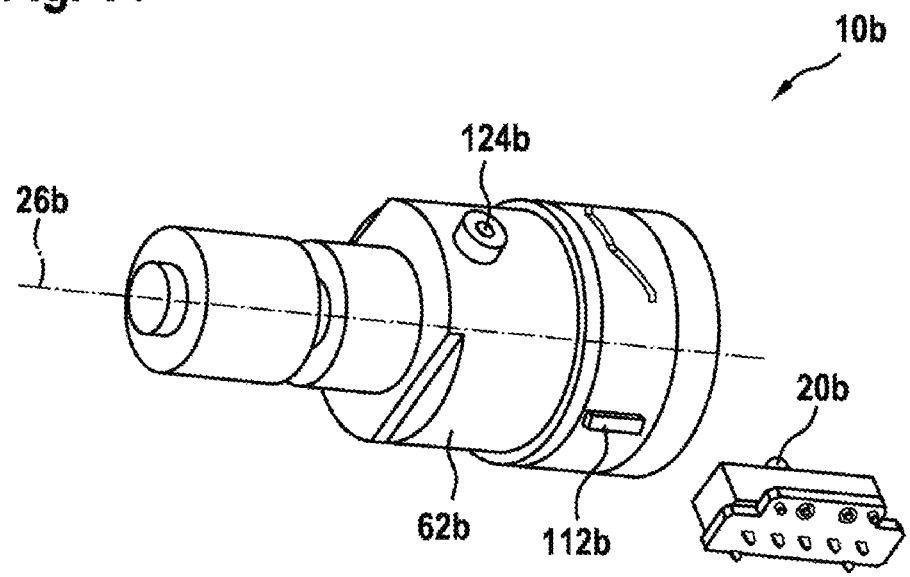

FIG. 14 shows a part of the power tool device 10b in a perspective representation. A perspective corresponds at least substantially to a perspective in FIG. 13. The actuation element 18b, and the activation element 22b fixed to the actuation element 18b, are not represented for reasons of clarity. The displacement element 24b is arranged at least substantially in the form of a ring around the transmission housing 62b. The fastening extension 112b of the displacement element 24b is clearly visible. The transmission housing 62b comprises a fastening button 124b. The fastening button 124b extends, at least portionally, radially away from the output axis 26b. The fastening button 124b is designed for mounting the actuation element 18b on the transmission housing 62b without use of any tools. The fastening button 124b is designed to limit a maximum rotational angle of the actuation element 18b about the output axis 26b. By means of the fastening button 124b, the switching element 20b is arranged in each switching position of the actuation element 18b between the first switching extension 102b and the second switching extension 104b.

FIG. 15 shows a front view of the power tool device 10b in a schematic representation. The second switching extension 104b is shown. The switching element 20b is arranged between the first switching extension 102b and the second switching extension 104b. The switching element 20b can be displaced by a rotation of the actuation element 18b, and of the activation element 22b coupled to the actuation element 18b, along the first direction of rotation 120b or along the second direction of rotation 122b, about the output axis 26b, at least substantially parallel to the output axis 26b. The switching element 20b can be displaced into a plane of the drawing or out of a plane of the drawing by a rotation of the actuation element 18b, and of the activation element 22b coupled to the actuation element 18b, along the first direction of rotation 120b or along the second direction of rotation 122b, about the output axis 26b.

The invention claimed is:

1. A power tool device, comprising:
    at least one drive train unit comprising at least one gear shift element, the at least one drive train unit having at least two different direction-of-rotation modes and at least two different speed modes; and
    at least one switching unit arranged at least partially on the at least one drive train unit, the at least one switching unit comprising (i) at least one actuation element configured for selection of the at least two different direction-of-rotation modes and the at least two different speed modes, and (ii) at least one switching element configured to switch between the at least two different direction-of-rotation modes in dependence on a switching position of the at least one actuation element.

2. The power tool device as claimed in claim 1, wherein the at least one switching unit comprises at least one activation element assigned to the at least one actuation element and configured to actuate the at least one switching element to sense the switching position of the at least one actuation element.

3. The power tool device as claimed in claim 2, wherein the at least one activation element is configured for mechanical actuation of the at least one switching element.

4. The power tool device as claimed in claim 1, wherein the at least one activation element is configured for contactless actuation of the at least one switching element.

5. The power tool device as claimed in claim 4, wherein the at least one switching element is configured as a Hall sensor.

6. The power tool device as claimed in claim 3, wherein the at least one switching element is configured as a mechanical switch or a signal switch.

7. The power tool device as claimed in claim 1, wherein the at least one switching unit includes at least one displacement element operatively connected to the at least one actuation element and configured to switch between the at least two different speed modes in dependence on the switching position of the at least one actuation element.

8. The power tool device as claimed in claim 7, wherein the at least one displacement element is configured to actuate the at least one gear shift element that is operatively connected to the at least one displacement element along an output axis of the at least one drive train unit for switching between the at least two different speed modes.

9. The power tool device as claimed in claim 7, wherein, for actuating the at least one displacement element, the at least one actuation element and/or the at least one displacement element are/is configured at least portionally as a ramp.

10. The power tool device as claimed in claim 8, wherein the at least one displacement element is mounted on the at least one drive train unit so as to be movable along the output axis of the at least one drive train unit.

11. The power tool device as claimed in claim 8, wherein the at least one displacement element has at least one shift gate configured to actuate the at least one gear shift element along the output axis of the at least one drive train unit.

12. The power tool device as claimed in claim 1, wherein the at least one actuation element is configured as a ring around the at least one drive train unit.

13. The power tool device as claimed in claim 1, wherein the at least one switching unit has at least one output unit configured for optical, acoustic, and/or haptic output in dependence on an actuation and/or the switching position of the at least one actuation element.

14. The power tool device as claimed in claim 1, wherein the at least one switching unit has a single actuation element of the at least one actuation element configured for selection of the at least two different direction-of-rotation modes and the at least two different speed modes.

15. The power tool device as claimed in claim 1, wherein the power tool device is included in a power tool.

* * * * *